United States Patent
Johnstone

(10) Patent No.: US 8,766,118 B2
(45) Date of Patent: Jul. 1, 2014

(54) SEISMIC ACTUATOR

(76) Inventor: Colin Johnstone, Palmdale, CA (US)

( * ) Notice: Subject to any disclaimer, the term of this patent is extended or adjusted under 35 U.S.C. 154(b) by 268 days.

(21) Appl. No.: 13/298,217

(22) Filed: Nov. 16, 2011

(65) Prior Publication Data

US 2012/0118712 A1    May 17, 2012

Related U.S. Application Data

(60) Provisional application No. 61/414,822, filed on Nov. 17, 2010.

(51) Int. Cl.
*H01H 3/16*    (2006.01)

(52) U.S. Cl.
USPC ............. 200/61.45 R; 200/61.52; 137/43; 137/45

(58) Field of Classification Search
USPC ....... 200/61.45 R, 61.49, 61.52, 277; 137/43, 137/45
See application file for complete search history.

(56) References Cited

U.S. PATENT DOCUMENTS

| | | | |
|---|---|---|---|
| 3,066,202 A | 11/1962 | Kaleba | |
| 4,058,134 A | 11/1977 | Komatsu | |
| 4,131,124 A * | 12/1978 | Sunde | 137/45 |
| 4,191,869 A | 3/1980 | Tanaka | |
| 4,314,120 A | 2/1982 | Sharp | |
| 4,353,383 A * | 10/1982 | Kiesel | 137/45 |
| 5,307,699 A | 5/1994 | Engdahl | |
| 5,482,074 A * | 1/1996 | Hanson | 137/45 |
| 5,975,105 A * | 11/1999 | Chang | 137/45 |
| 6,058,959 A | 5/2000 | Mandel | |
| 2002/0014264 A1 | 2/2002 | Crane | |

FOREIGN PATENT DOCUMENTS

JP    57010021    1/1982

* cited by examiner

*Primary Examiner* — Renee S Luebke
*Assistant Examiner* — Ahmed Saeed
(74) *Attorney, Agent, or Firm* — Brennan C. Swain, Esq.; Jeffer Mangels Butler & Mitchell LLP

(57) ABSTRACT

An actuator that includes a shelf having a pivot cone, a first member, a second member, a trigger pin and a trigger lever latch. The first member includes a weight, a first shaft extending upwardly from the weight and through an opening in the pivot cone, and a first plate affixed to the first shaft. The first plate is supported by the pivot cone. The second member includes a second plate resting on the first plate and a second shaft extending upwardly from the second plate. The trigger lever latch includes a first portion connected to the second shaft and a second portion extending upwardly at an angle away from the first portion. The trigger pin has an engagement surface. The trigger pin is movable between an operational state and a tripped state. The second end of the trigger lever latch is engaged with the engagement surface.

27 Claims, 34 Drawing Sheets

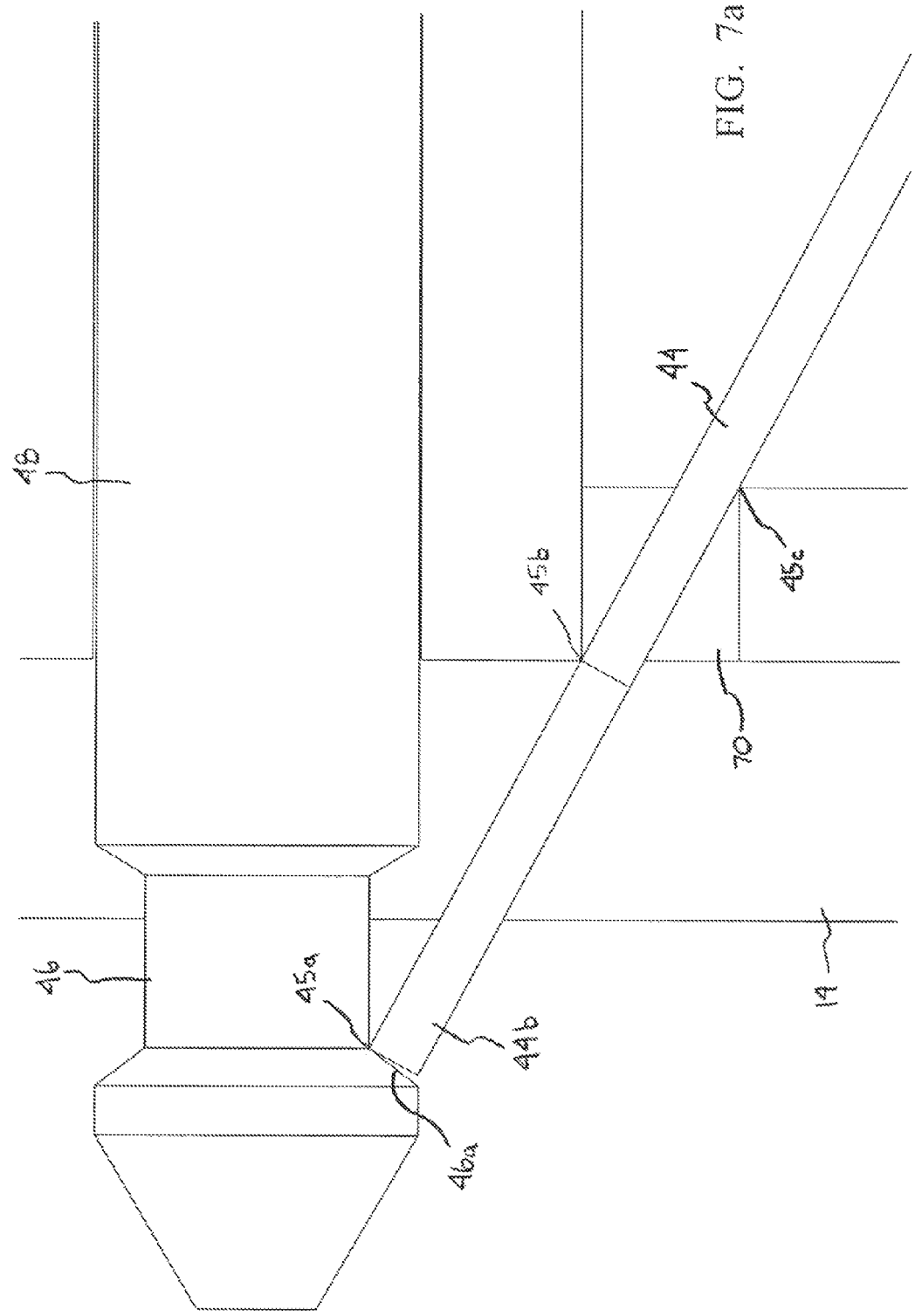

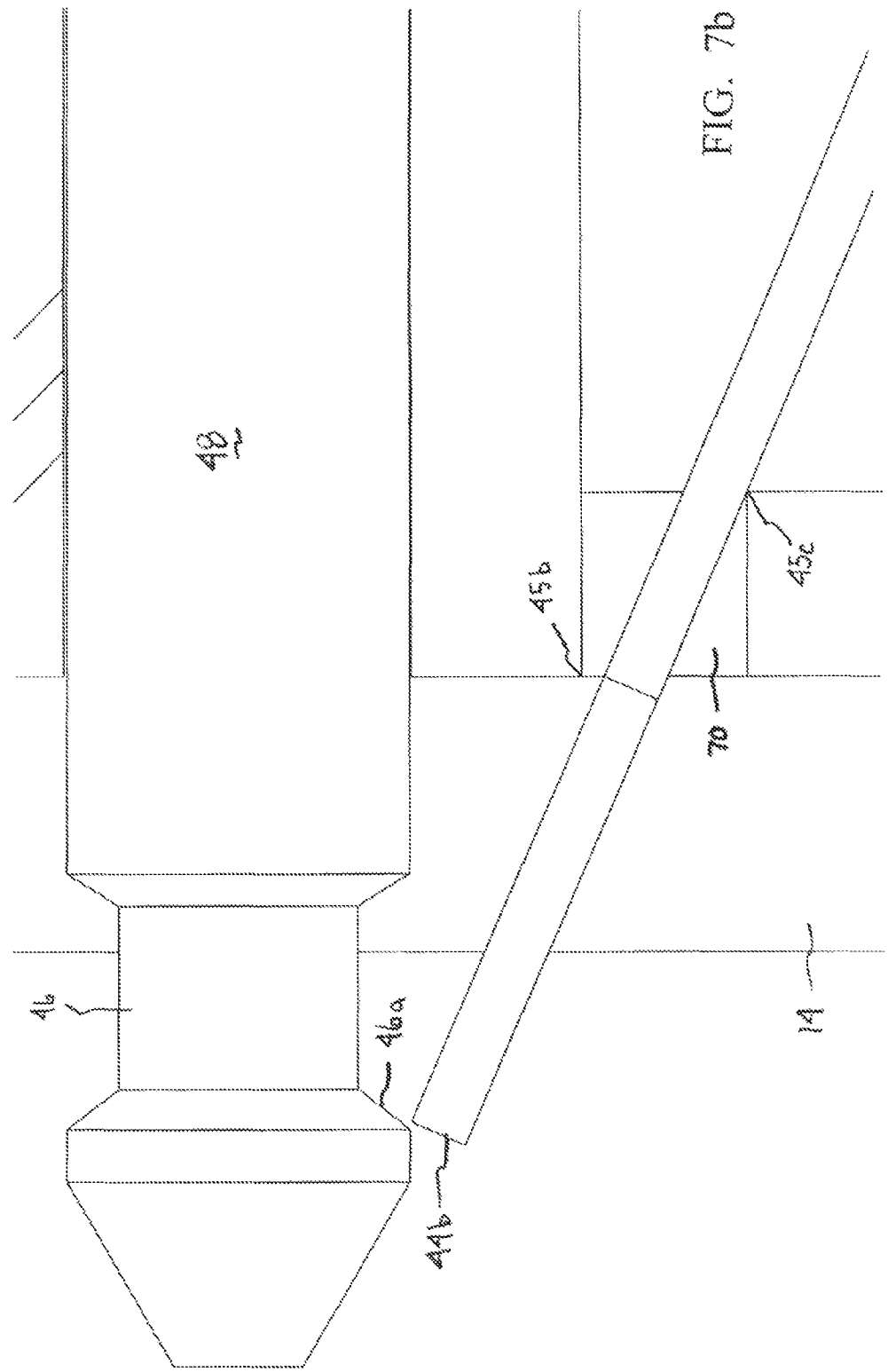

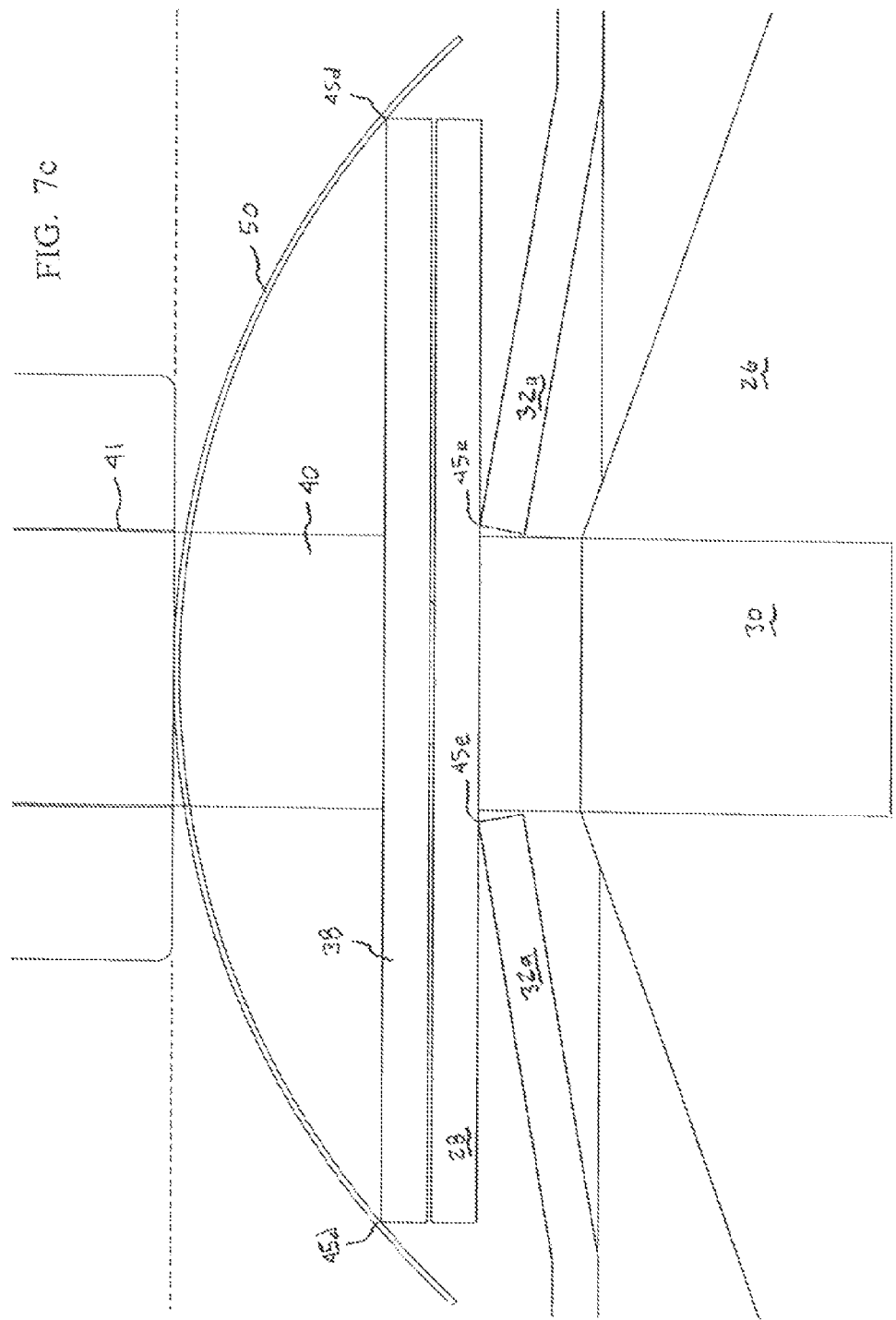

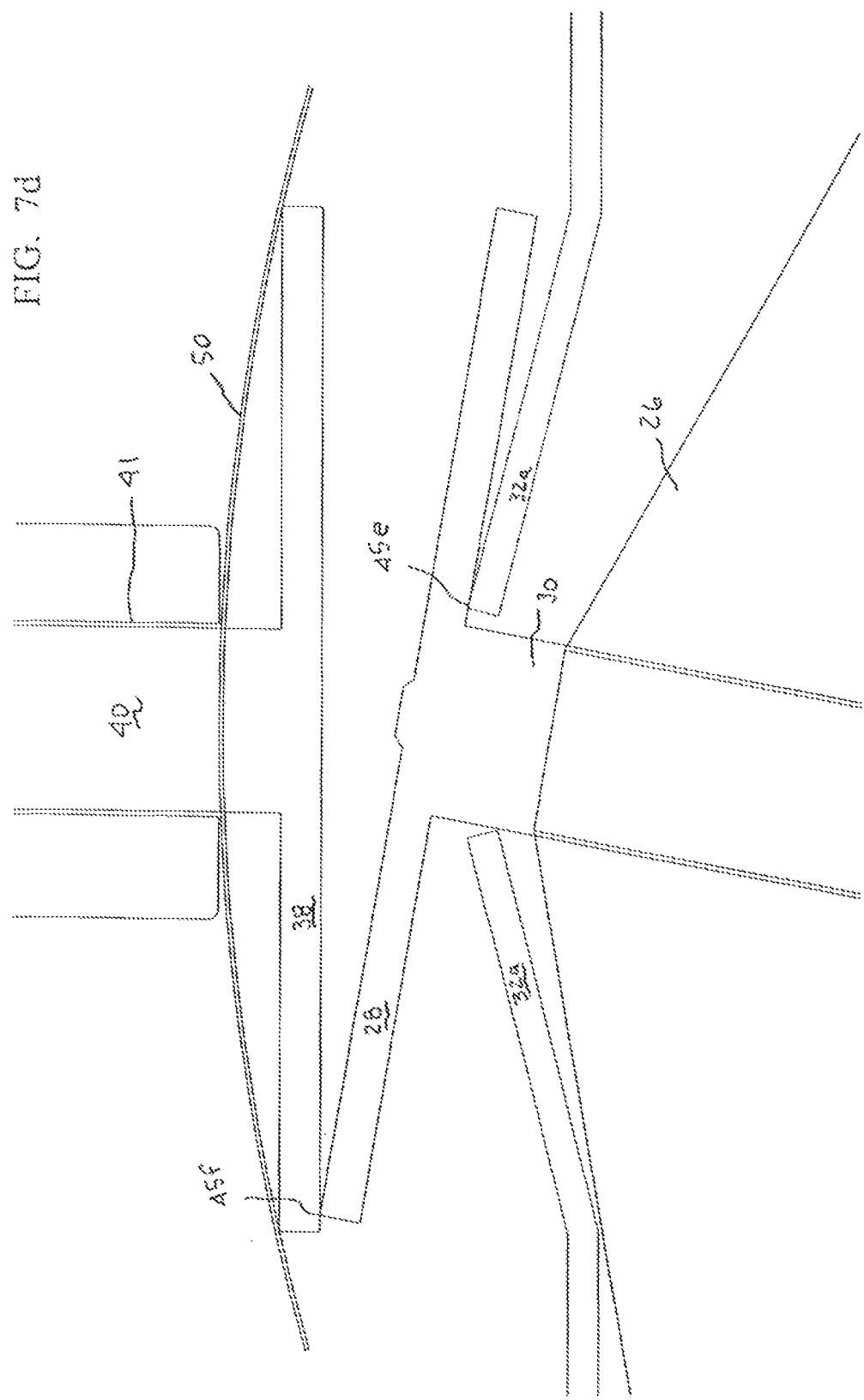

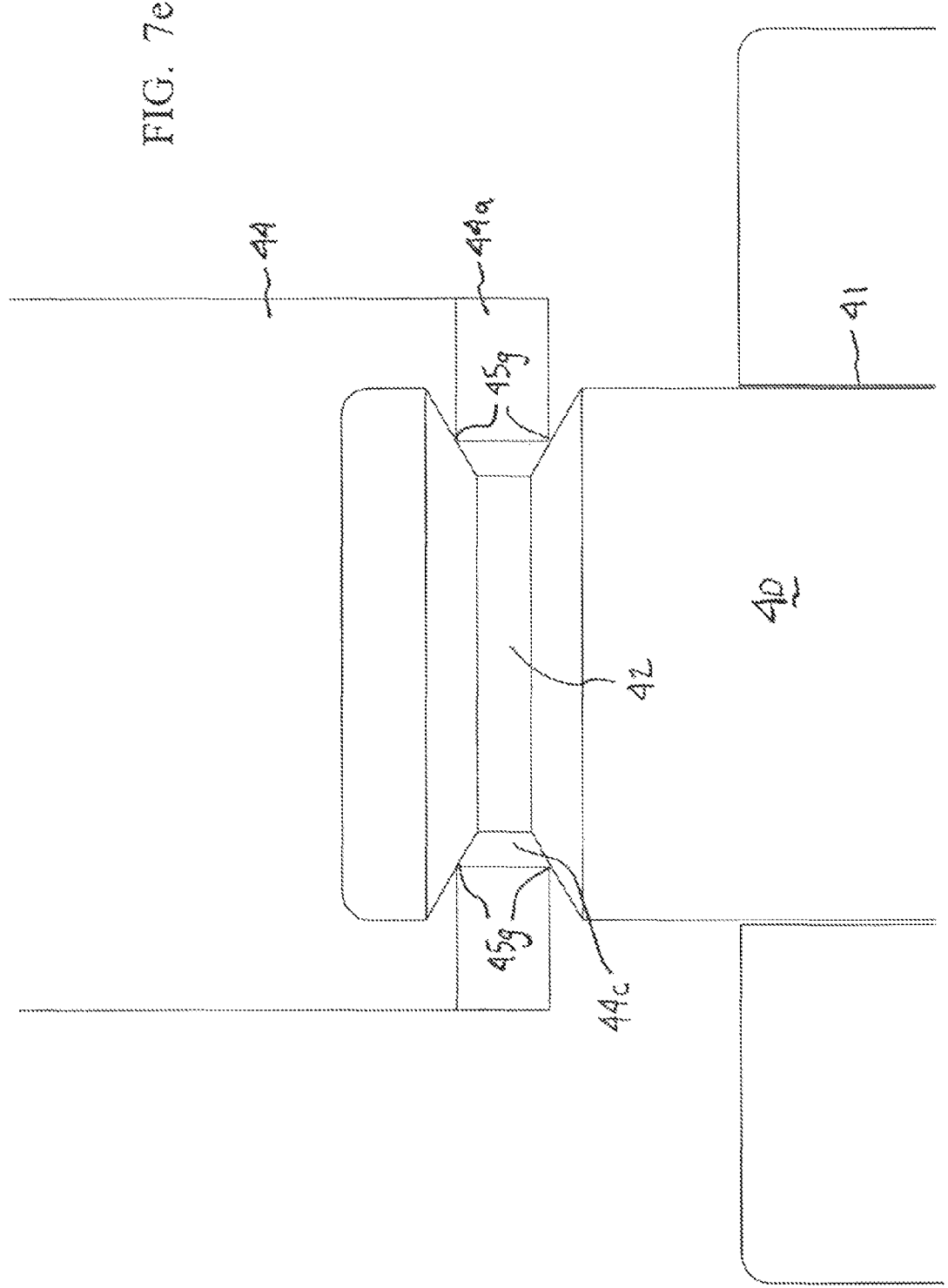

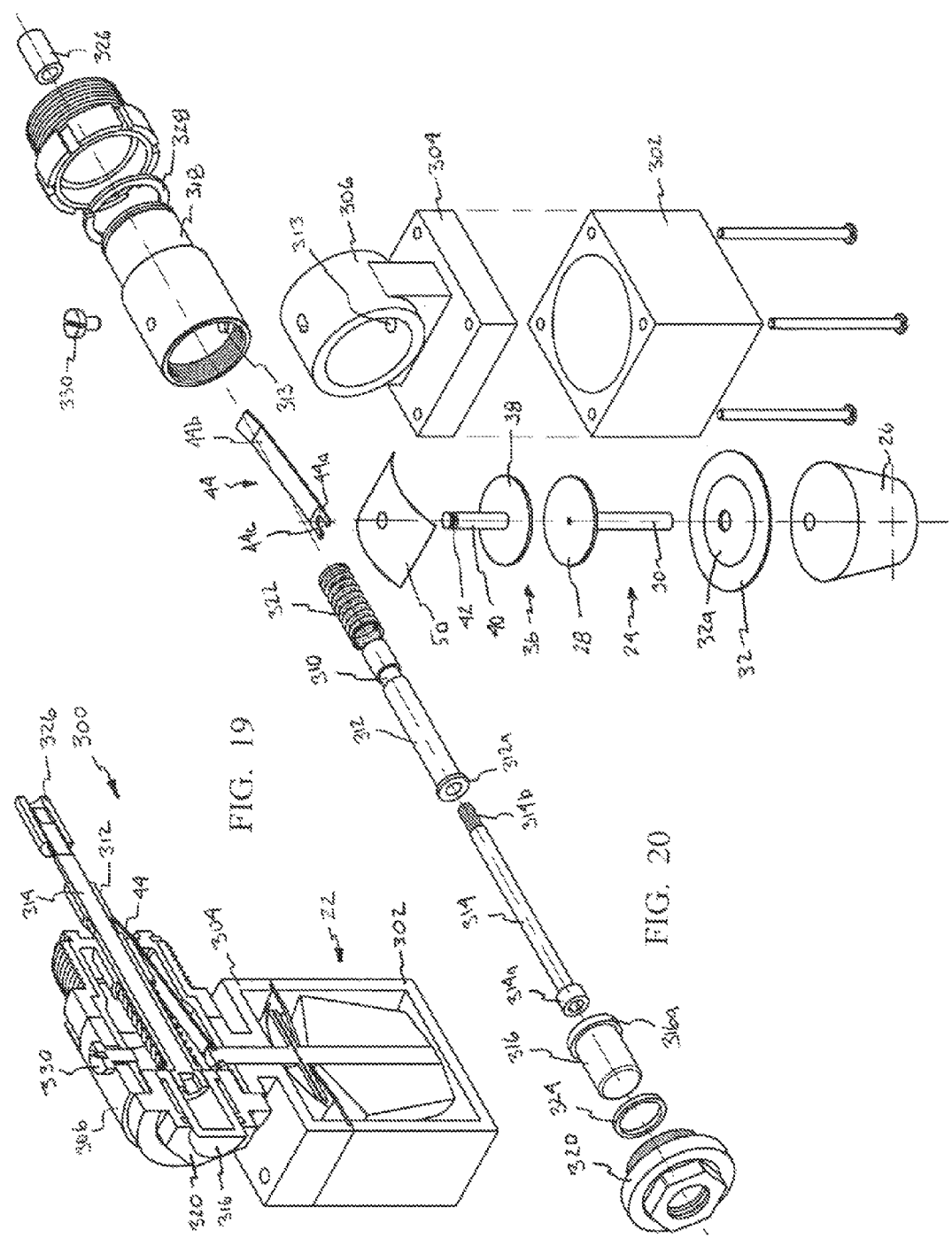

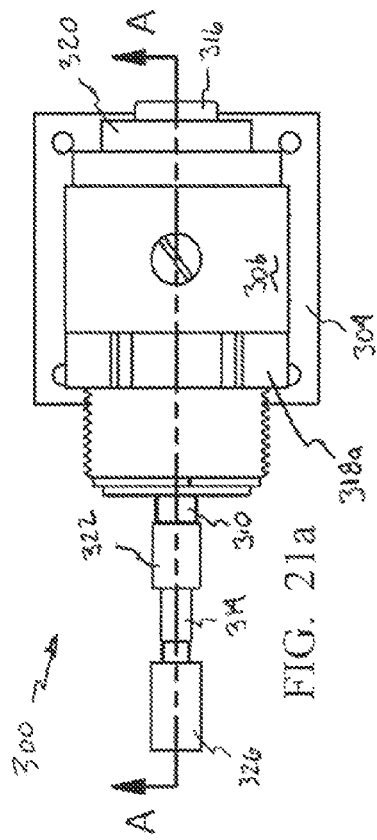
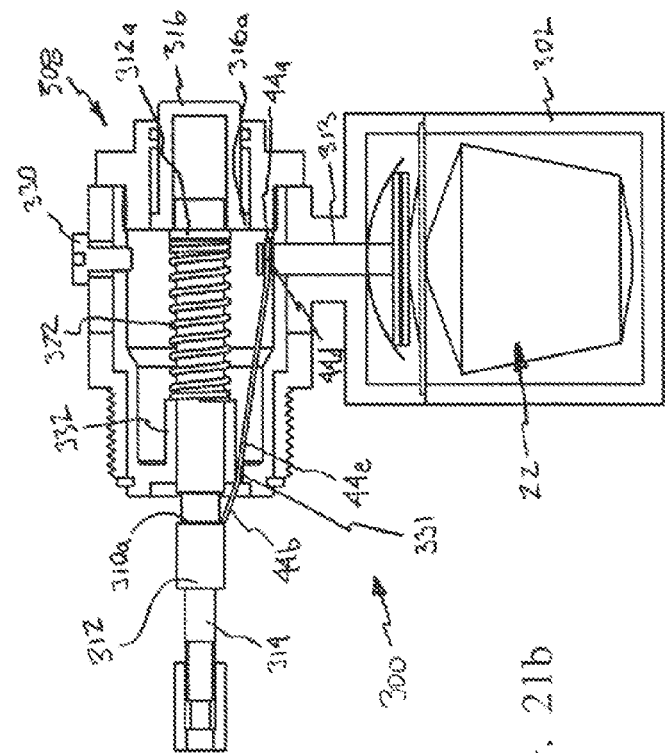
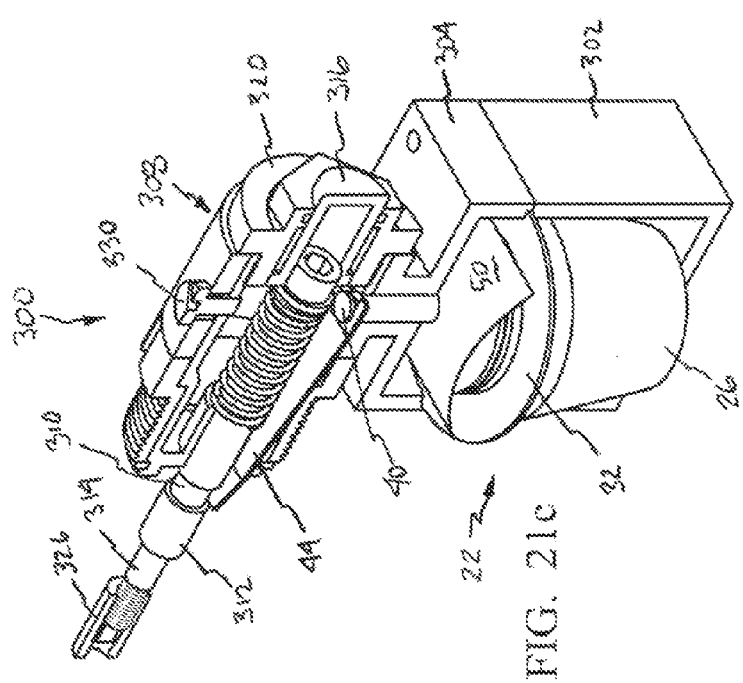
FIG. 21a
FIG. 21b
FIG. 21c

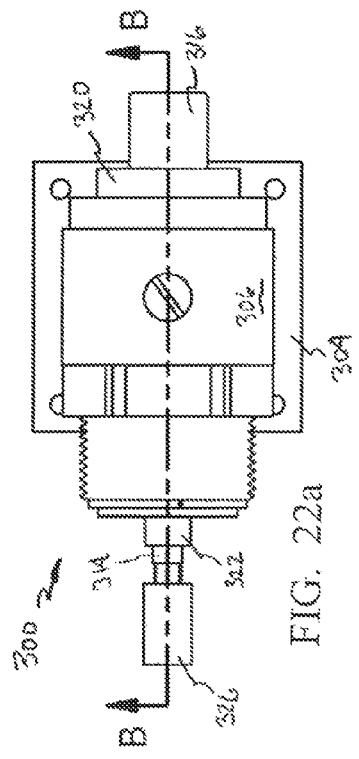
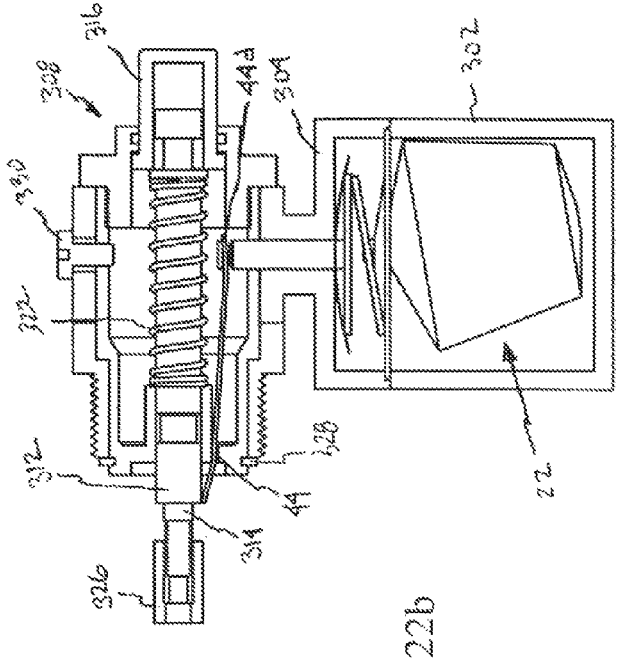
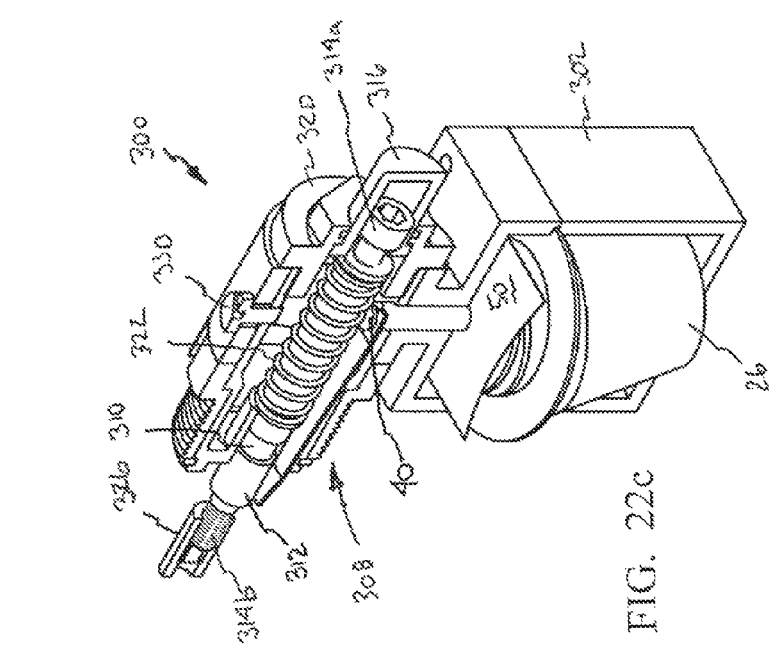
FIG. 22a
FIG. 22b
FIG. 22c

SEISMIC ACTUATOR

This application claims the benefit of U.S. Provisional Application No. 61/414,822, filed Nov. 17, 2010, which is herein incorporated, by reference in its entirety.

FIELD OF THE INVENTION

The present invention relates generally to seismic actuators.

BACKGROUND OF THE INVENTION

Earthquakes can cause significant damage to the infrastructure of the area in and around the epicenter and fat beyond. Much of this damage can be caused by fires set off by downed power lines or other damage to electrical lines and the rupture of natural gas lines due to the seismic activity. Electricity and natural gas are used in most residential homes and businesses. However, fires resulting from gas escaping a ruptured gas line or sparks from ruptured power lines during an earthquake can often cause more damage than the seismic shockwaves themselves.

In order to prevent fires from ruptured gas or power lines during an earthquake, devices have been developed that include switches for automatically shutting off the power or flow of gas within a gas line upon seismic activity above a threshold level. However, many of these devices have been difficult to retrofit to common breaker boxes or gas valves. Accordingly, a need exists for such a device.

SUMMARY OF THE PREFERRED EMBODIMENTS

In accordance with a first aspect of the present invention there is provided a seismic electrical breaker assembly that includes a weight and wobble plate assembly, trigger lever latch, circuit breaking components and a reset button. The seismic electrical breaker assembly can be used in conjunction with a reset mechanism and may be retrofitted into an existing 200 amp main breaker or other electrical box.

In accordance with another aspect of the present invention there is provided a seismic actuated micro-switch assembly that includes a weight and wobble plate assembly that is in communication with micro-switch. A threshold amount of seismic activity switches the micro-switch on or off, depending on the configuration. The seismic operated micro switch 200 can be used for operating big contactors into the thousands of amps and or mega watts in power houses, power line, transformers, business, or elsewhere.

In accordance with another aspect of the present invention there is provided a seismic gas valve actuator that includes a weight and wobble plate assembly, trigger lever latch, gas shut off components and a reset button. The seismic actuated gas shut off valve actuator can be retrofitted or used with standard gas regulators when gas shut off in the event of seismic activity is desired.

In accordance with yet another aspect of the present invention there is provided a seismic mercury switch that can be used with circuit boards.

In accordance with still another aspect of the present invention there is provided an actuator that includes a shelf that includes a pivot cone having an opening defined therein, a first member, a second member, a trigger pin and a trigger lever latch. The first member includes a weight movable between an operational state and a tripped state, a first shaft extending upwardly from the weight and through the opening in the pivot cone, and a first plate affixed to the first shaft. The first plate is supported by the pivot cone. The second member includes a second plate in contact with the first plate and a second shaft extending upwardly from the second plate. The trigger lever latch includes first and second ends, a first portion operatively associated with the second shaft and a second portion extending upwardly at an angle away from the first portion. The trigger pin defines an axis and has an engagement surface defined thereon. The trigger pin is movable between an operational state and a tripped state and is biased toward the tripped state. The second end of the trigger lever latch is engaged with the engagement surface to hold the trigger pin in the operational state. Movement of the weight from the operational state to the tripped state moves the second end of the trigger lever latch downwardly and out of the notch, thus causing the trigger pin to be biased to the tripped state.

In a preferred embodiment, the actuator includes a housing and a bottom cover that supports the shelf. The first member is positioned in the bottom cover, the trigger pin and trigger lever latch a positioned in the housing, and the second shaft extends between the bottom cover and the housing. The housing preferably includes an opening through which the second portion of the trigger lever latch extends. The opening is at least partially defined by a surface, and the second portion of the trigger lever latch rests on the surface when the trigger pin is in the tripped state. This keeps the trigger lever latch positioned for reset. Preferably, the second shaft includes a groove defined therein and the first portion of the trigger lever latch includes a slot defined therein, and the slot is received in the groove.

In a preferred embodiment, the second member includes a leaf spring having an opening defined therein. The second shaft extends through the opening in the leaf spring, and the leaf spring biases the second plate to an operational state. Preferably, the engagement surface (which can be part of a groove, notch or the like) defines a first angle with respect to the trigger pin axis, the second end of the trigger lever latch defines a second angle with respect to the trigger pin axis, and the first and second angles are different.

In accordance with another aspect of the present invention there is provided a method that occurs in the event of seismic activity. The method includes providing an actuator that includes a first member comprising a weight movable between an operational state and a tripped state, a first shaft extending upwardly from the weight, and a first plate affixed to the first shaft, a second member that comprising a second plate supported by the first plate, and a second shaft extending upwardly from second plate, a trigger lever latch having first and second ends, a first portion operatively associated with the second shaft and a second portion extending upwardly at an angle away from the first portion, and a trigger pin movable between an operational state and a tripped state that is biased toward the tripped state. The second end of the trigger lever latch is engaged with the trigger pin. The method further includes moving the weight from the operational state to the tripped state via seismic activity, moving at least a portion of the first plate upwardly, moving the second plate upwardly, moving the first end of the trigger lever latch upwardly, moving the second end of the trigger lever latch downwardly, thereby disengaging the second end of the trigger lever latch from the trigger pin, and moving the trigger pin from the operational state to the tripped state. In a preferred embodiment, the method includes the step of opening a circuit when the trigger pin is moved from the operational state to the tripped state or stopping a flow of gas when the trigger pin is moved from the operational state to the tripped state.

In accordance with another aspect of the present invention there is provided a seismic actuated circuit breaker assembly that includes a housing having a bottom cover extending downwardly therefrom, circuit breaking components and a trigger pin disposed within the housing, a shelf positioned in and supported by the bottom cover, a first member, a second member and a trigger lever latch. The trigger pin defines an axis, has a notch defined therein, is movable between an operational state and a tripped state and is biased toward the tripped state. The circuit breaking components include at least a movable set of contacts that are in contact with a stationary set of contacts when the trigger pin is in the operational state. The shelf includes a pivot cone having an opening defined therein. The first member includes a weight movable between an operational state and a tripped state, a first shaft extending upwardly from the weight and through the opening in the pivot cone, and a first plate affixed to the first shaft. The first plate is supported by the pivot cone. The second member includes a second plate in contact with the first plate, and a second shaft extending upwardly from the second plate. The trigger lever latch has first and second ends, a first portion operatively associated with the second shaft and a second portion extending upwardly at an angle away from the first portion. The second end of the trigger lever latch is positioned in the notch to hold the trigger pin in the operational state. In operation, movement of the weight from the operational state to the tripped state moves the second end of the trigger lever latch downwardly and out of the notch, which causes the trigger pin to move to the tripped state, thereby moving the movable set of contacts out of contact with the stationary set of contacts.

In a preferred embodiment, the notch includes an engagement surface, that is engaged by the second end of the trigger lever latch. The engagement surface defines a first angle with respect to the trigger pin axis, the second end of the trigger lever latch defines a second angle with respect to the trigger pin axis, and the first and second angles are different. Preferably, the set of movable contacts are positioned on a beam that includes an opening into which the trigger pin extends. The housing includes a side cover having an opening defined therein and the beam includes a stem that extends into the opening in the side cover. At least a portion of the stem extends outside the cover when the trigger pin is in the tripped state. In a preferred embodiment, the stationary set of contacts are in electrical communication with buss bars, which are adapted to be connected within an electrical circuit.

In accordance with yet another aspect of the present invention there is provided a reset mechanism that includes a housing having back, top, bottom, left and right side walls and a from opening, a door and a reset pin. The front opening is at least partially surrounded by a flange that is adapted to be secured to a panel in an electrical box. The door is movable between an operational state and a tripped state, and is adapted to be secured to the panel in the electrical box. The reset pin has first and second ends and is movable between an operational state and a tripped state. The first end extends through an opening in the back wall of the housing and the second end has a reset button secured thereon. When the reset pin moves from the operational state to the tripped state, the reset button moves the door from the operational state to the tripped state.

In a preferred embodiment, the reset mechanism includes a holder rod having first and second sections and extending through a second opening in the back wall of the housing. The second section of the holder rod has a larger diameter than the first section, and the first section includes a threaded opening in an end thereof that receives a threaded fastener. The second end of the holder rod includes a magnet, and a spring is received on the first section and extends between the back wall and the second section. Rotational movement of the threaded fastener moves the magnet axially.

In accordance with yet another aspect of the present invention there is provided a seismic actuated gas shut off valve assembly for use with a gas regulator having a diaphragm. The assembly includes a housing having a bottom cover extending downwardly therefrom, a trigger pin disposed within the housing, a shelf positioned in and supported by the bottom cover, a first member, a second member, and a trigger lever latch. The trigger pin defines an axis, includes an engagement surface, is movable between an operational state and a tripped state, and is biased toward the tripped state. The trigger pin includes first and second ends, and the second end is adapted to be operatively connected to the diaphragm of the gas regulator. The shelf includes a pivot cone having an opening defined therein. The first member includes a weight movable between an operational state and a tripped state, a first shaft extending upwardly from the weight and through the opening in the pivot cone, and a first plate affixed to the first shaft. The first plate is supported by the pivot cone. The second member includes a second plate in contact with the first plate, and a second shaft extending upwardly from the second plate. The trigger lever latch has first and second ends, a first portion operatively associated with the second shaft and a second portion extending upwardly at an angle away from the first portion. The second end of the trigger lever latch engages the engagement surface of the trigger pin in the operational state. Movement of the weight from the operational state to the tripped state moves the second end of the trigger lever latch downwardly and out of the notch, which moves the trigger pin to the tripped state, thereby causing the gas regulator to cut off gas flow.

In a preferred embodiment, the engagement surface defines a first angle with respect to the trigger pin axis, the second end of the trigger lever latch defines a second angle with respect to the trigger pin axis, and the first and second angles are different. Preferably, the trigger pin includes a sleeve received thereon, and the engagement surface is defined in the sleeve. The second end of the trigger pin includes external threads that receive a threaded hushing that is adapted to be connected to the diaphragm. The housing includes a reset button in associated with the first end of the trigger pin. Preferably, the housing includes a top cover that is secured to the bottom cover, a ring secured to the top cover, and a two piece threaded insert sleeve received in the ring. The two piece threaded insert sleeve is adapted to be connected to the gas regulator.

In accordance with yet another aspect of the present invention there is provided a seismic actuated micro-switch assembly that includes a bottom section having an interior, an upper section having a micro-switch with an on state and an off state secured thereto, a shelf that spans the interior of the bottom section and includes a pivot cone having an opening defined therein, a first member, and a second member. The micro-switch includes a button that when pushed switches the micro-switch between the on and off states. The first member includes a weight movable between an operational state and a tripped state, a first shaft extending upwardly from the weight and through the opening in the pivot cone, and a first plate affixed to the first shaft. The first plate is supported by the pivot cone. The second member includes a second shaft having first and second ends, and a second plate affixed to the second end of the second shaft. The first end of the second shaft is supported by the first plate. The second shaft extends through an opening in the upper section, and the second plate is operatively associated with the button. When hen the weight is moved to the tripped state, the second plate pushes the button, thereby switching the micro-switch between the on and off states. In a preferred embodiment, the second member further comprises a point portion on the first end of the second shaft that is supported by the first plate. The point portion has a smaller diameter than the second shaft.

In accordance with another aspect of the present invention there is provided a method of switching a micro-switch between on and off states. The method includes providing a micro-switch assembly that includes a bottom section having an interior, an upper section having a micro-switch with an on state and an off state secured thereto, a shelf that spans the interior of the bottom section and includes a pivot cone having an opening defined therein, a first member and a second member. The micro-switch includes a button that when pushed switches the micro-switch between the on and off states. The first member includes a weight movable between an operational state and a tripped state, a first shaft extending upwardly from the weight and through the opening in the pivot cone, and a first plate affixed to the first shaft. The first plate is supported by the pivot cone. The second member is supported by the first member and includes a second shaft having first and second ends, and a second plate affixed to the second end of the second shaft. The method further includes moving the weight from the operational state to the tripped state via seismic activity, moving at least a portion of the first plate upwardly, moving the second member upwardly, and pushing the button, thereby switching the micro-switch between the on and off the state.

In accordance with another aspect of the present invention there is provided a seismically actuated mercury switch that includes a body that defines an interior and contains mercury within the interior, and upper and lower conductors that are separated by at least a portion of the interior to define a gap. The mercury bridges the gap between the upper and lower conductors such that the upper conductor is in electrical communication with the lower conductor. In the event of a predetermined amount of seismic activity, the mercury moves such that it does not bridge the gap between the upper and lower conductors, thereby stopping electrical communication between the upper and lower conductors. In a preferred embodiment, the body is non-conductive. Preferably, the body includes first and second lower ramps positioned on either side of the lower conductor that partially define the interior, and the body includes first and second upper ramps positioned on either side of the upper conductor that partially define the interior.

The invention, together with additional features and advantages thereof, may be best understood by reference to the following description taken in conjunction with the accompanying illustrative drawings. In these accompanying drawings, like reference numerals designate like parts throughout the figures.

BRIEF DESCRIPTION OF THE DRAWINGS

FIG. 7a is a detailed view of a portion of the seismic electrical breaker assembly of FIG. 1 showing knife edge contact points in an operational state;

FIG. 7b is a detailed view of a portion of the seismic electrical breaker assembly of FIG. 1 showing knife edge contact points in a tripped state;

FIG. 7c is a detailed view of a portion of the seismic electrical breaker assembly of FIG. 1 showing knife edge contact points in an operational state;

FIG. 7d is a detailed view of a portion of the seismic electrical breaker assembly of FIG. 1 showing knife edge contact points in a tripped state;

FIG. 7e is a detailed view of a portion of the seismic electrical breaker assembly of FIG. 1 showing knife edge contact points in an operational state;

FIG. 19 is a perspective view of the seismic gas valve assembly of FIG. 18 with a portion of the housing cut away to see the interior;

FIG. 20 is an exploded perspective view of the seismic gas valve assembly of FIG. 18;

FIG. 21a is a top elevational view of the seismic gas valve assembly of FIG. 18;

FIG. 21b is a side sectional view of the seismic gas valve assembly of FIG. 18 taken along line A-A of FIG. 21a and showing the valve in an open or operational state;

FIG. 21c is a perspective view of the seismic gas valve assembly of FIG. 18 with a portion of the housing cut away to see the interior and showing the valve in an open or operational state;

FIG. 22a is a top elevational view of the seismic gas valve assembly of FIG. 18;

FIG. 22b is a side sectional view of the seismic gas valve assembly of FIG. 18 taken along line B-B of FIG. 21a and showing the valve in an closed or tripped state;

FIG. 22c is a perspective view of the seismic gas valve assembly of FIG. 18 with a portion of the housing cut away to see the interior and showing the valve in a closed or tripped state;

Like numerals refer to like structures or features throughout the several views of the drawings.

DETAILED DESCRIPTION OF THE PREFERRED EMBODIMENTS

Figure 1:
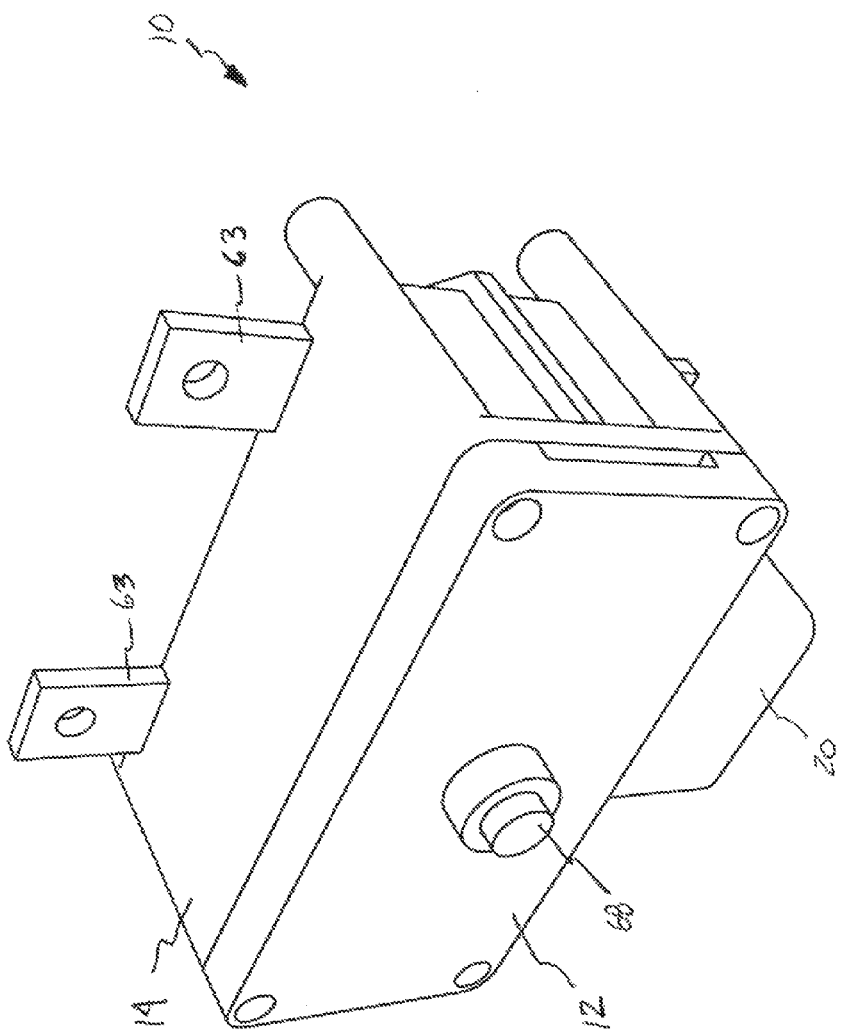
FIG. 1 is a perspective view of a seismic electrical breaker assembly in accordance with a preferred embodiment of the present invention.
Figure 2A:
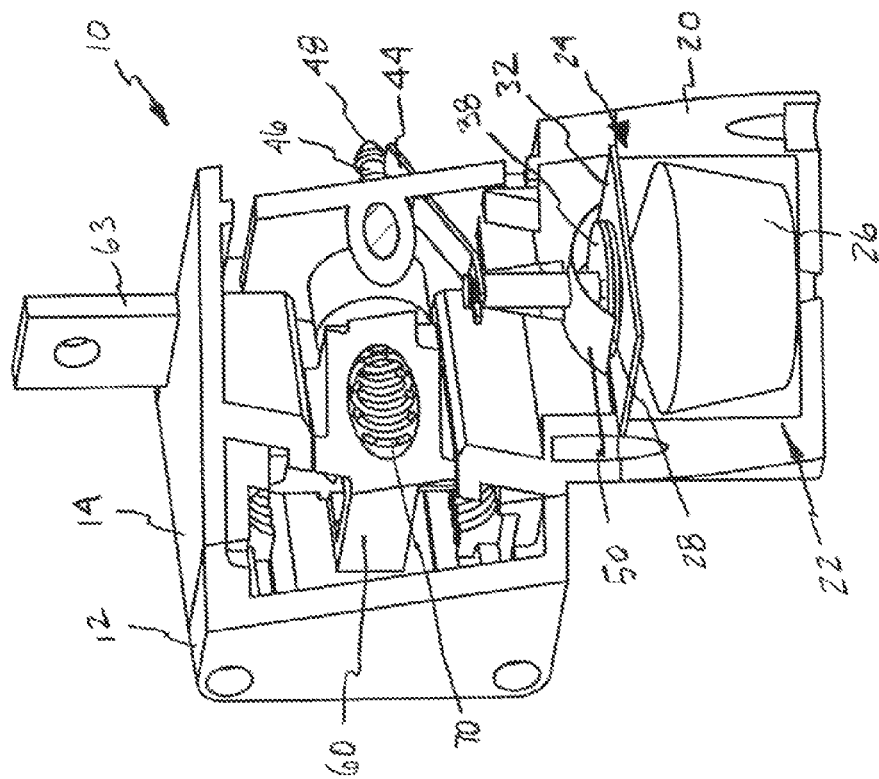
FIG. 2a is a perspective view of the seismic electrical breaker assembly of FIG. 1 with a portion of the housing cut away to see the interior.
Figure 2B:
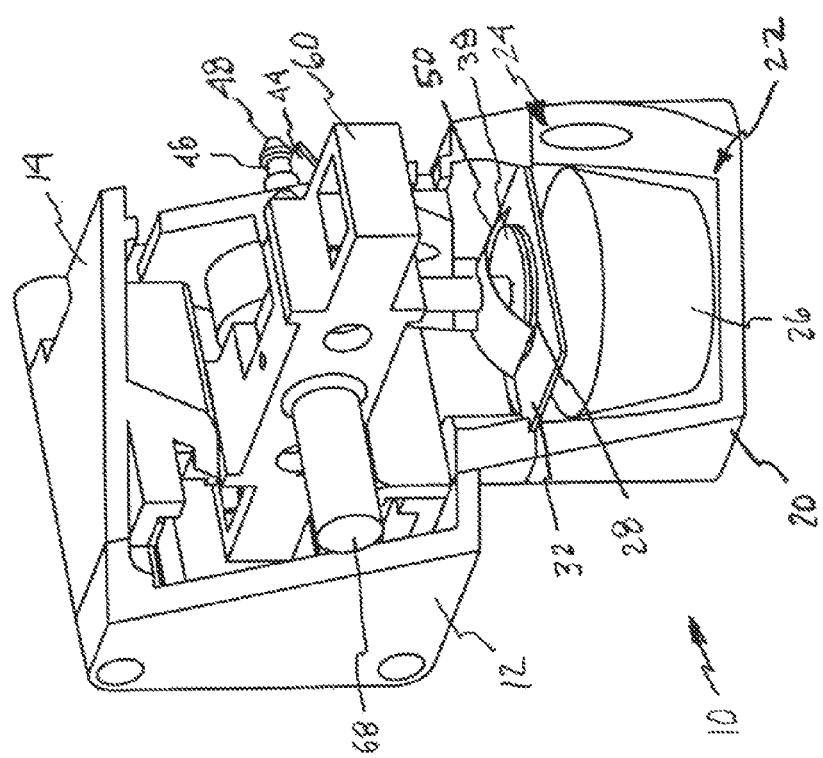
FIG. 2b is a perspective view of the seismic electrical breaker assembly of FIG. 1 with a portion of the housing cut away to see the interior.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the seismic actuators and the components thereof described herein is within the scope of the present invention.

Referring now to the drawings, wherein the showings are for purposes of illustrating the present invention and not for purposes of limiting the same, FIGS. 1-23b show different embodiments of seismic actuators for shutting off electric and gas flow in the event of an earthquake or other seismic activity at a predetermined threshold level. FIGS. 1-12b show a seismic actuated electrical circuit breaker together with a reset mechanism, FIGS. 13-17 show a seismic actuated micro switch and FIGS. 18-23b show a seismic actuated gas shut off valve. All of the seismic actuators include a weight and wobble plate assembly. FIGS. 24a-26 show seismic actuated mercury switches.

With reference to FIGS. 1-12b, the seismic electrical breaker assembly 10 together with a reset mechanism 100 is shown. Preferably, the seismic electrical breaker assembly 10 can be retrofitted to existing electrical or circuit breaker boxes. The assembly 10 includes a side cover 12, body or housing 14 that houses circuit breaking components 16 and a bottom cover 20 that houses a weight and wobble plate assembly 22.

Figure 4:
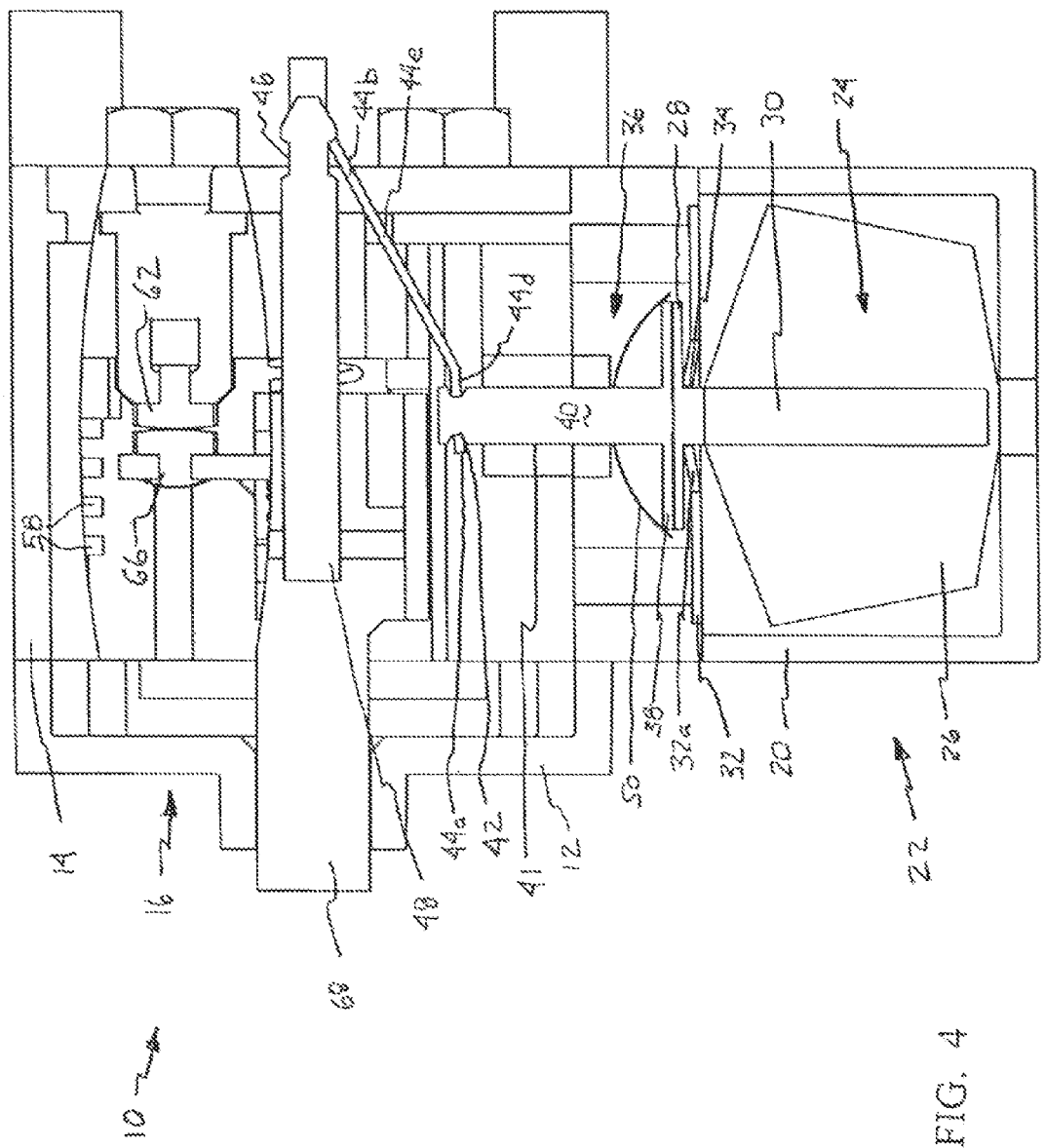
FIG. 4 is a side sectional view of the seismic electrical breaker assembly of FIG. 1 showing the weight and wobble plate assembly in an operational state.

The weight and wobble plate assembly 22 includes a first member 24 that includes a weight or pendulum 26 that is connected to a wobble plate/disc or first disc 28 by a first shaft 30. These three parts are preferably a single unit (these components can be formed as a unit or separate pieces joined together). A shelf 32 having an opening 34 therein spans the interior of bottom cover 20. The shelf 32 includes a pivot cone 32a formed thereon through which opening 34 extends. Shaft 30 extends through opening 34 and first disc 28 rests on pivot cone 32a. The weight and wobble plate assembly 22 further includes a second member 36 that comprises a second plate/disc 38 having a second shaft 40 extending upwardly therefrom through an opening 41 in the bottom of body 14. The second shaft 40 includes a circumferential groove or notch 42 defined near the distal or upper end thereof. A trigger lever latch 44 that includes first and second ends 44a and 44b and a slot 44c defined therein is received on second shaft 40 at groove 42. Trigger lever latch 44 also includes a first portion 44d and a second portion 44e that extends upwardly at an angle from first portion 44d, as is best shown in FIG. 4. The second end 44b of trigger lever latch 44 is received in a groove 46 on a trip pin 48 that is housed in body 14 and will be described more fully below. In a preferred embodiment, groove 46 in trip pin 48 includes an angular/engagement surface 46a against which second end 44b of trigger lever latch 44 sits flush in the operational state.

Figure 5:
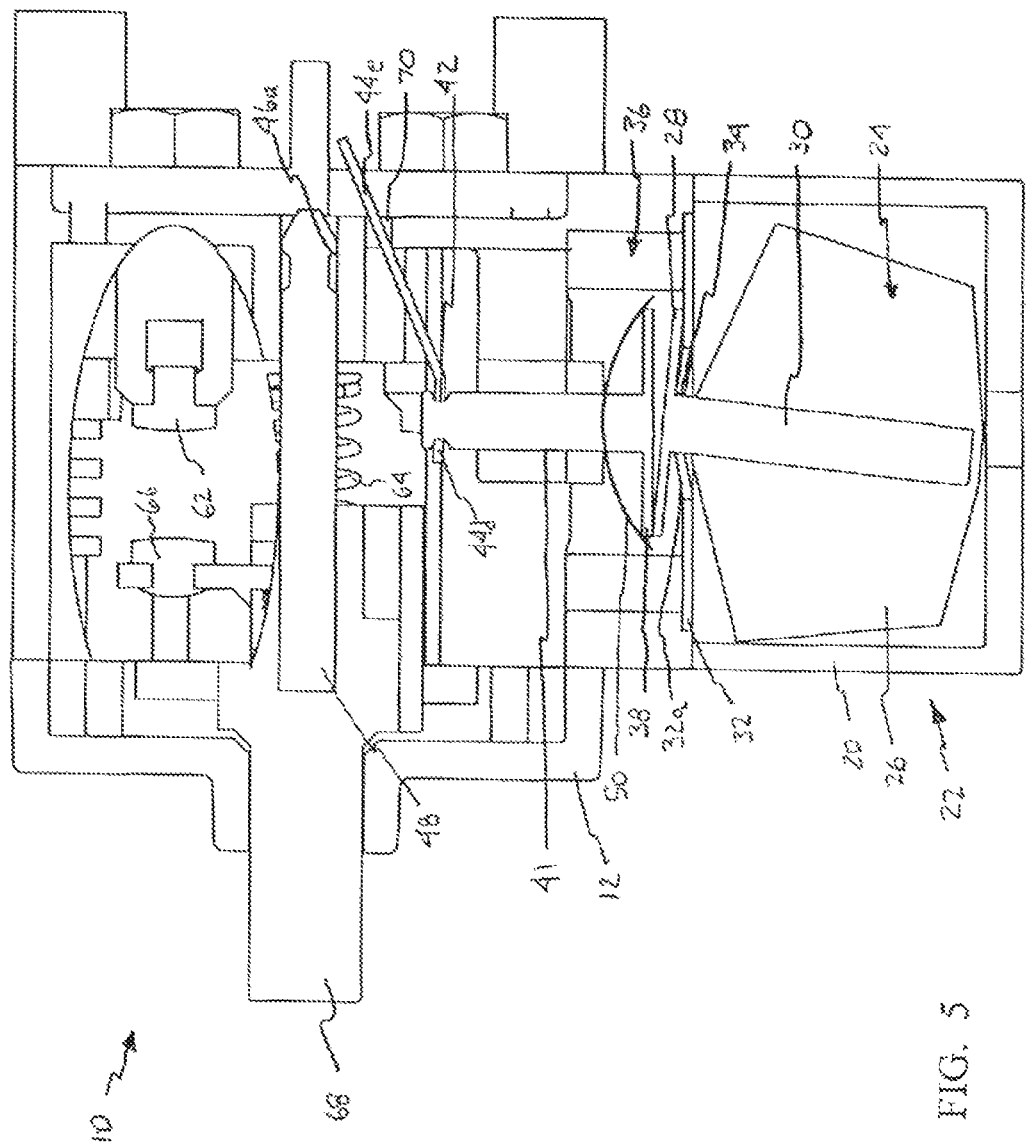
FIG. 5 is a side sectional view of the seismic electrical breaker assembly of FIG. 1 showing the weight and wobble plate assembly in a tripped state.

As shown in FIG. 4, in the operational or non-actuated state, first disc 28 rests on pivot cone 32a and weight 26 hangs like a pendulum. Second disc 38 rests on first disc 28 and second shaft 40 extends upwardly. As shown in FIG. 5, when an earthquake or any jostling event (movement in any direction –360°, up, down, left, right, etc.) occurs, the weight 26 swings (in FIG. 5 to the left). The term seismic activity, as used herein, can be any jostling event, and is not limited only to earthquake activity. Because of the angle between the top surface of pivot cone 32a and the bottom surface of first disc 28, the right side of first disc 28 moves downwardly, thus causing the left side of first disc 28 to move upwardly. This, in turn, pushes second disc 38, second shaft 40, and the first portion 44d of trigger lever latch 44 upwardly. Because of the angle between the first and second portions 44d and 44e of trigger lever latch 44, when the first end 44a moves upwardly, the second end 44b moves downwardly, thus disengaging second end 44b from angular surface 46a, thus tripping trip pin 48 as described below. In a preferred embodiment, the weight and wobble plate assembly 22 also includes an arc shaped leaf spring 50 received on shaft 40 that is positioned between second disc 38 and the bottom of body 14. The leaf spring helps engage the second end 44b of lever latch 44 into groove 46 with sufficient force to produce the desired predetermined seismic tripping level. The overhang of the leaf spring 50 over the second plate 38 helps counteract friction and maintain repeatability. However, the overhang is not necessary. In an alternative embodiment, the leaf spring can be omitted.

In a preferred embodiment, the "tripping components," e.g., the trigger lever latch 44, leaf spring 50, pivot cone 32a, first and second discs 28 and 38 and trip pin 48, are configured for optimal and repeatable tripping at a predetermined level. This optimization can help overcome adverse conditions associated with normal use, such as adverse weather conditions, friction, humidity, etc. FIGS. 7a-7e are detailed views that show optimized tripping components in accordance with a preferred embodiment. It will be understood that these are not a limitation on the present invention.

Figure 7F:
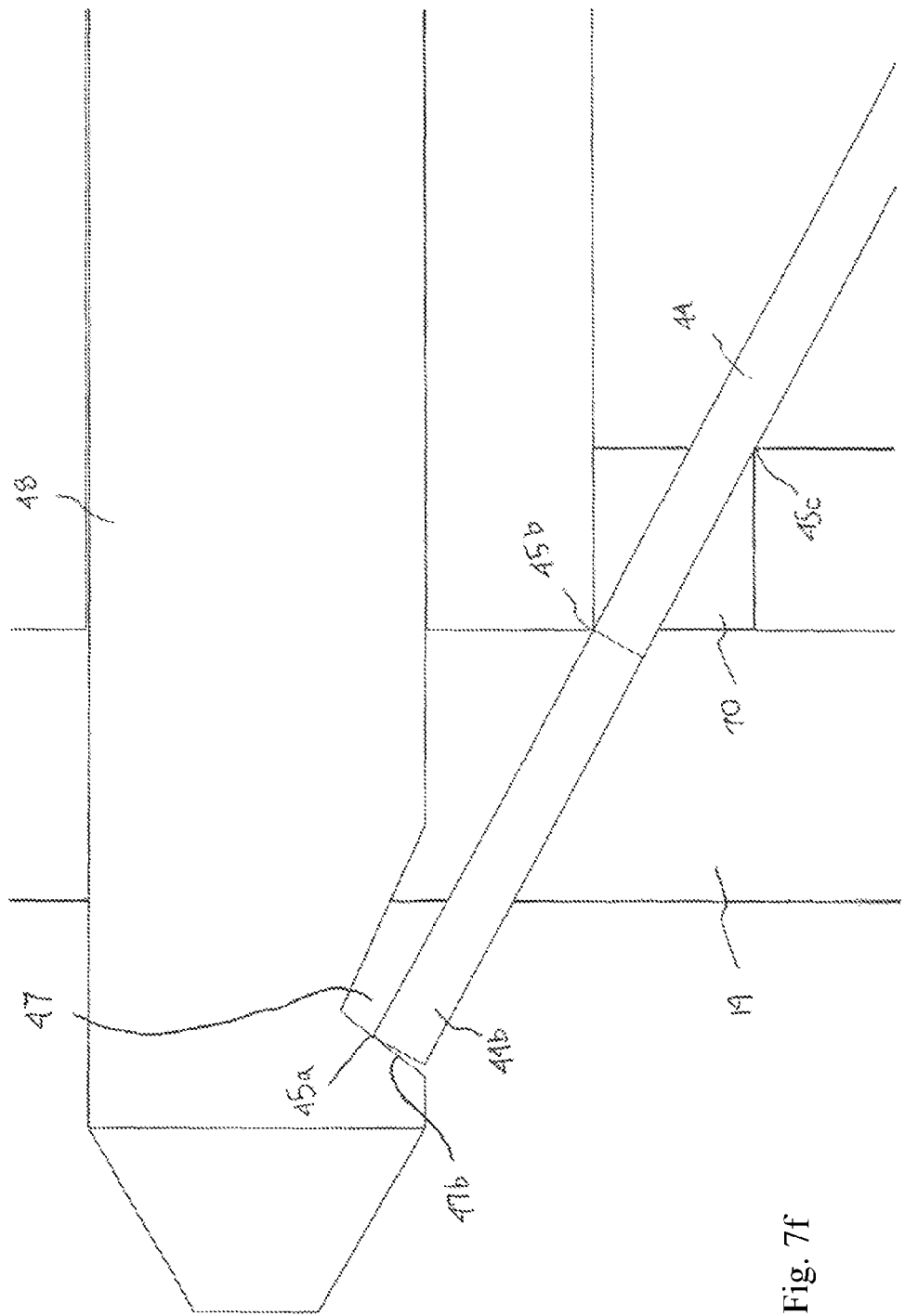
FIG. 7f is a detailed view of a portion of the seismic electrical breaker assembly of FIG. 1 showing knife edge contact points in an operational state.
Figure 8:
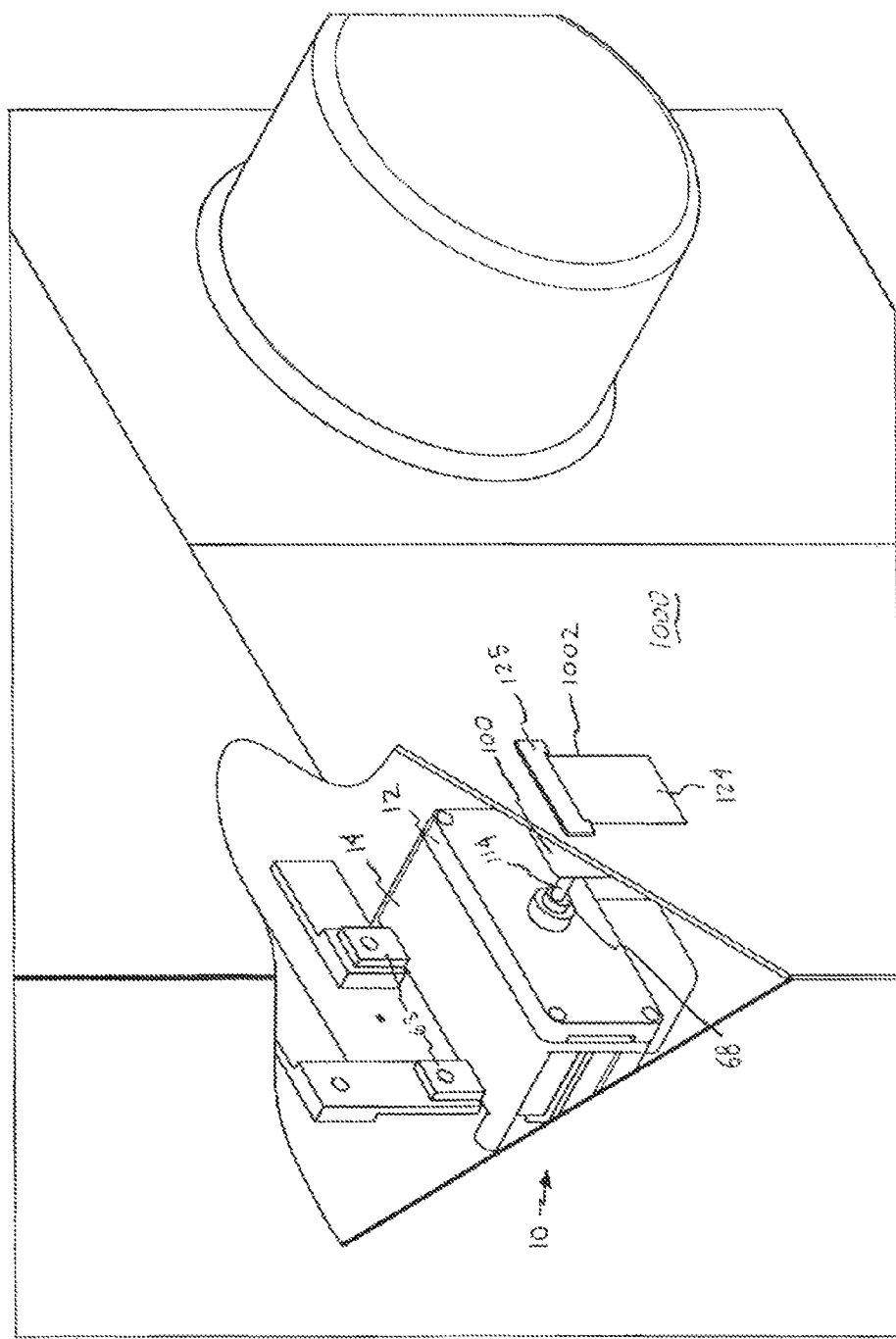
FIG. 8 is a perspective view of the seismic electrical breaker assembly of FIG. 1 together with a reset mechanism mounted in a standard electrical box.
Figure 9:
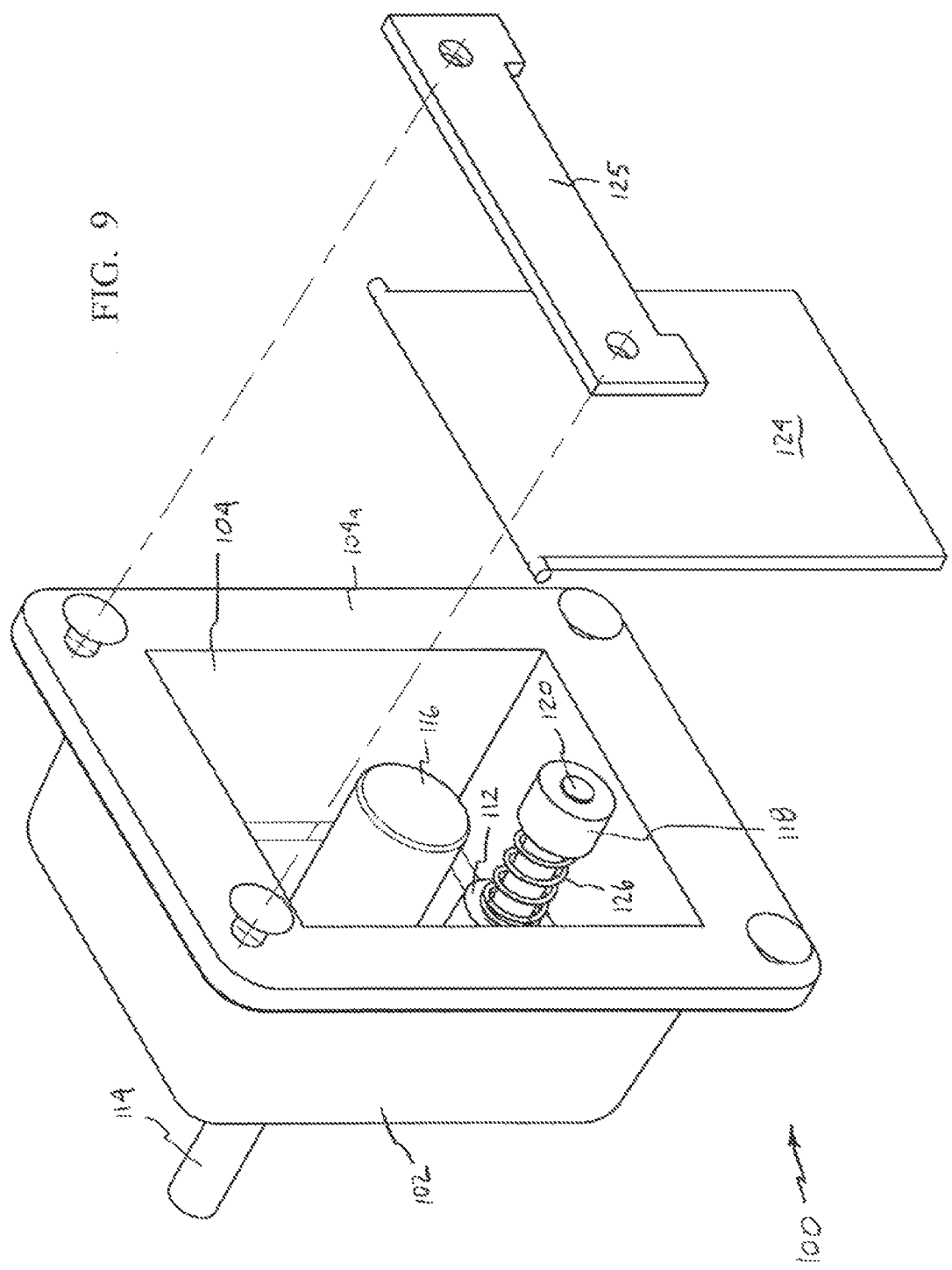
FIG. 9 is a perspective view of a reset mechanism for use with the seismic electrical breaker assembly of FIG. 1 in accordance with a preferred embodiment of the present invention showing the cover removed.

As shown in FIG. 7a, in a preferred embodiment, knife edge contact is desired at many of the contact points between the trigger lever latch 44, trip pin 48 and opening 70. As will appreciated by those skilled in the art, the smaller the contact surface area, the lower the friction and the greater the repeatability. These knife edge contact points are all referred to herein as 45 generally and are designated individually as 45a-45g. Preferably, the angle between the flat second end 44b and surface 46a is different, thus providing knife edge contact point 45a. As can be seen in FIGS. 7a and 7f, engagement surface 46a and second end 44b define different angles with respect to the axis defined by trigger pin 48. Knife edge contact points 45b and 45c are provided between trigger lever latch 44 and the corners or surfaces of body 14 where opening 70 is defined. Contact point 45b takes the pivot forces as the trigger lever latch 44 disengages from groove 46 in pin 48. Contact point 45c opens up to a clearance as the trigger lever latch 44 disengages from groove 46 in pin 48 and pivots with the main body as the trigger lever latch 44 engages in the groove 46 of pin 48 when being reset. FIG. 7b shows the clearance at point 45b during reset mode or tripped state. FIG. 7f shows another embodiment where instead of a groove 46 around the pin 48, a notch 47 is defined therein. This notch 47 includes a surface 47a against which the second end 44b of lever latch 44 is engaged. Preferably, the angle between the flat second end 44b and surface 47a is different, thus providing knife edge contact point 45a.

FIG. 7c shows knife edge contact points 45d between the leaf spring 50 and second disc 38 and knife edge contact points 45e between the pivot cone 32a and first disc 28. FIG. 7d shows knife edge contact point 45f between the first and second discs 28 and 38 during seismic activity.

FIG. 7e shows knife edge contact points 45g between the edges of slot 44c and the angular surface 42a of groove 42.

Figure 3:
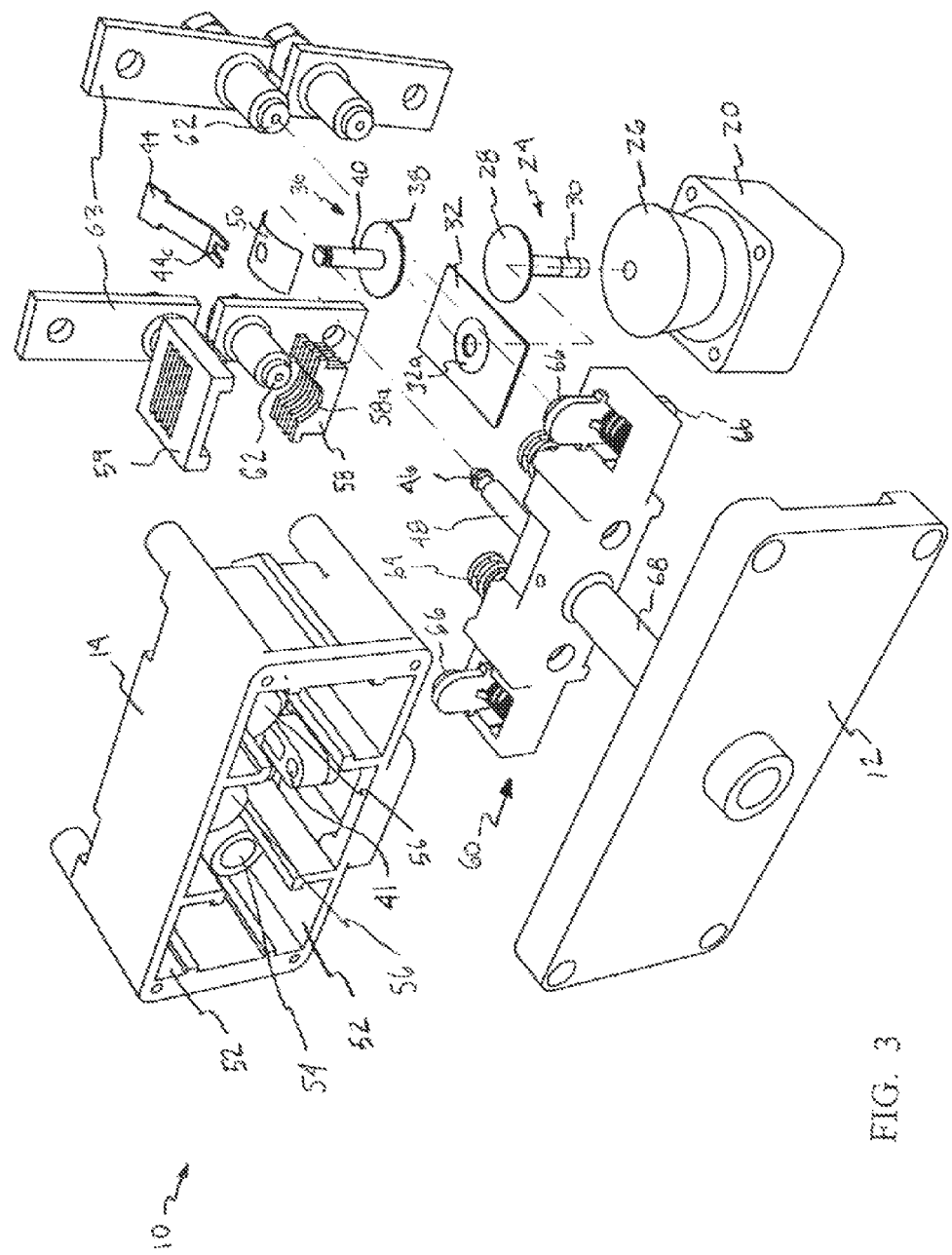
FIG. 3 is an exploded perspective view of the seismic electrical breaker assembly of FIG. 1.

As is best shown in FIG. 3, in a preferred embodiment, body 14 includes quencher slots 52, contact bushings 54 and spring pads 56. Body 14 preferably houses arc quenchers 58 and frames 59, beam 60, stationary contacts 62 and trip pin 48 with contact beam stem 68. Beam 60 includes springs 64 and spring loaded or movable contacts 66.

The arc quenchers 58 include a radius or indentation 58a that allow the arc quenchers 58 to be positioned close to the contacts 62. In a preferred embodiment, the assembly includes four sets of arc quenchers 58 that are each position in a frame 59 and are received in slots 52. The contacts 62 extend through contact bushings 54 and are connected to buss bars 63 that extend outside of the body 14 and are connected as desired within an electrical circuit, as will be appreciated by those skilled in the art. The contacts 62 can be riveted, welded or otherwise attached to the buss bars 63.

Removable buss bars 63 connect tightly with small bolts to posts/contacts 62, which are pressed into main body 14 after it is knurled. In a preferred embodiment, a small knurled interference is used. The buss bars 63 can be long or short and can include angles or dog legs to match the different connections in manufactures of the 200 amp standard main breaker boxes. Those skilled in the art will understand that the circuit is closed when the stationary set of contacts 62 are in contact with the movable set of contacts 66, as shown in FIG. 4 and that the circuit is broken when the stationary set of contacts 62 are not in contact with the movable set of contacts 66, as shown in FIG. 5.

Figure 3A:
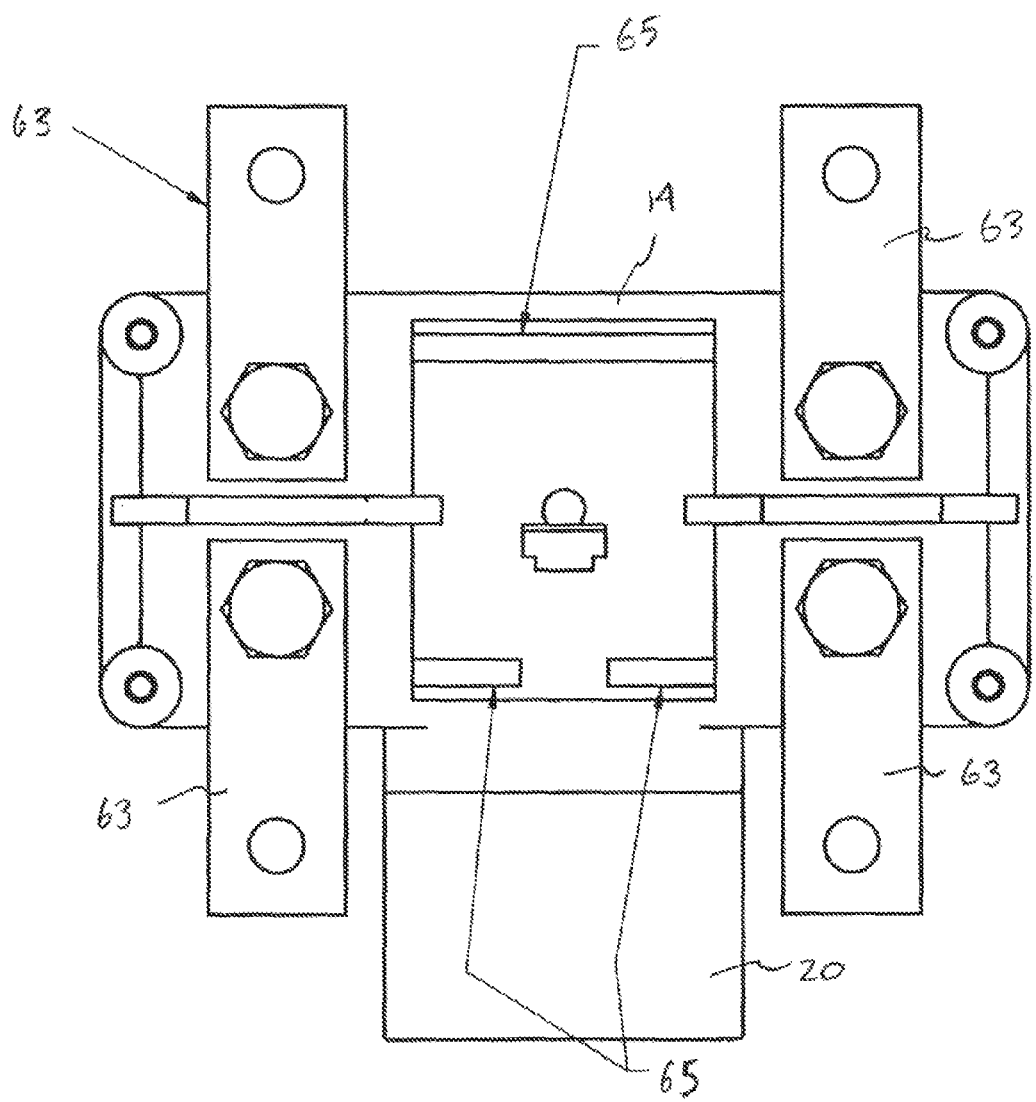
FIG. 3a is a rear elevational view of the seismic electrical breaker assembly of FIG. 1

As shown in FIG. 3a, in a preferred embodiment, the body 14 can include two or more vents 65 defined in the side cover 12. The vents 65 are useful when humid air expands rapidly when the contacts open and high temperatures are created as an arc flash occurs. Without the vents, the high pressure created would not be released. In use, the main line power input can be either in through either the top or bottom buss bars 63 as the installation requires. A standard breaker box comes with mechanical terminal connection blocks for the main line input. In a preferred embodiment, the present invention buss bars 63 fit directly into these terminal blocks and are the means of suspension that hold out the 200 amp breaker in position entirely by these connections. The other two buss bars of the 200 amp breaker provide the main line input to the mechanical terminal blocks to the breaker box.

The beam 60 includes two openings for housing a portion of the springs 64, top and bottom spring loaded contacts 66 that complement contacts 62, and an opening running transversely therethrough through which pin 48 extends.

As shown in FIG. 4, in the operational mode, the trigger lever latch 44 holds pin 48 in position, which provides contact between contacts 62 and 66, thereby keeping the circuit closed. Springs 64 are compressed against spring pads 56. When seismic activity occurs and the weight and wobble assembly 22 causes the second end 44b of trigger lever latch 44 to disengage from groove 46 (as described above) the trip pin 48, springs 64 urge the beam 60 and associated components, including pin 48 and contacts 66 away from contacts 62 (to the left in FIGS. 4-5). This breaks electrical contact between contacts 62 and contact 66, thereby breaking the circuit. Any flash or arc is quenched by arch quenchers 58.

To reset the assembly and close the circuit, a user presses contact beam stem 68, which moves trip pin 48 to the right (as shown in the figures) until the second end 44b of trigger lever latch 44 engages groove 46 and is seated against angular surface 46a. At the same time, springs 64 are once again compressed against spring pads 56. In a preferred embodiment, as is shown in FIG. 5, trigger lever latch 44 extends through a narrow opening 70 in body 14. This narrow opening 70 helps maintain repeatability by holding trigger lever latch 44 in position in the triggered state so that when the contact beam stem 68 is pushed, the trigger lever latch 44 once again engages groove 46 and holds the trip pin 48 in the operational state.

Figure 6:
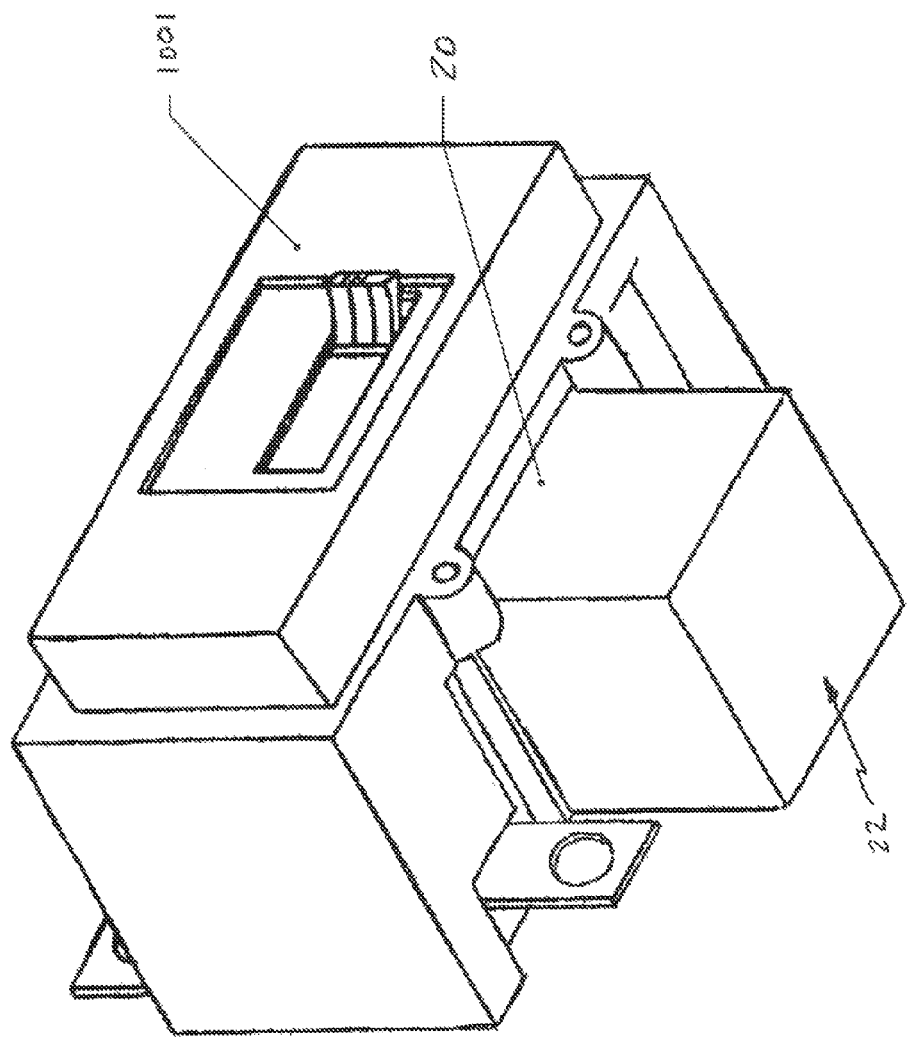
FIG. 6 is a perspective view of a standard 200 amp main breaker panel with a weight and wobble plate assembly fitted therein in accordance with a preferred embodiment of the present invention.

FIG. 6 is a drawing of an existing 200 amp main breaker 1001 together with a weight and wobble assembly 22 and body 20. The inventor found that this worked well, but there was no room in the standard breaker box to anchor it or accommodate it. It was impossible to fit in a standard breaker box as supplied today. In use, the standard breaker box would have to be redesigned. This can be done. However, in a preferred embodiment, the seismic electrical breaker assembly 10 (which includes the weight and wobble assembly 22) is sized to fit in a standard box 1000. Therefore, instead of redesigning the breaker box, seismic switch 10 was designed to be capable of carrying the 200 amp load but does not sense amperage at all and, therefore, fits in the breaker box 1000 in a different position from a standard breaker that cuts the main power off without interfering with the standard 200 amp breaker which senses amperage only and the other individual circuit breakers that come with the breaker box. It will be understood that this is not a limitation on the present invention, however, and the weight and wobble plate assembly 22 can be used separately as desired.

Therefore, by supplying and replacing the new small panel with the reset door that pops out and is described below, the seismic switch 10 is a simple and inexpensive seismic solution to break only.

In a preferred embodiment, the seismic switch 10 is for turning power off only. In use, the existing standard breaker must be turned off first, then the seismic switch 10 reset and the residence or business must be checked for earthquake damage before turning on the main breaker again.

In another embodiment, breaker boxes can be redesigned and the seismic switch 10 can modified for amperage sensing and a seismic sensing breaker in one function.

Figure 10:
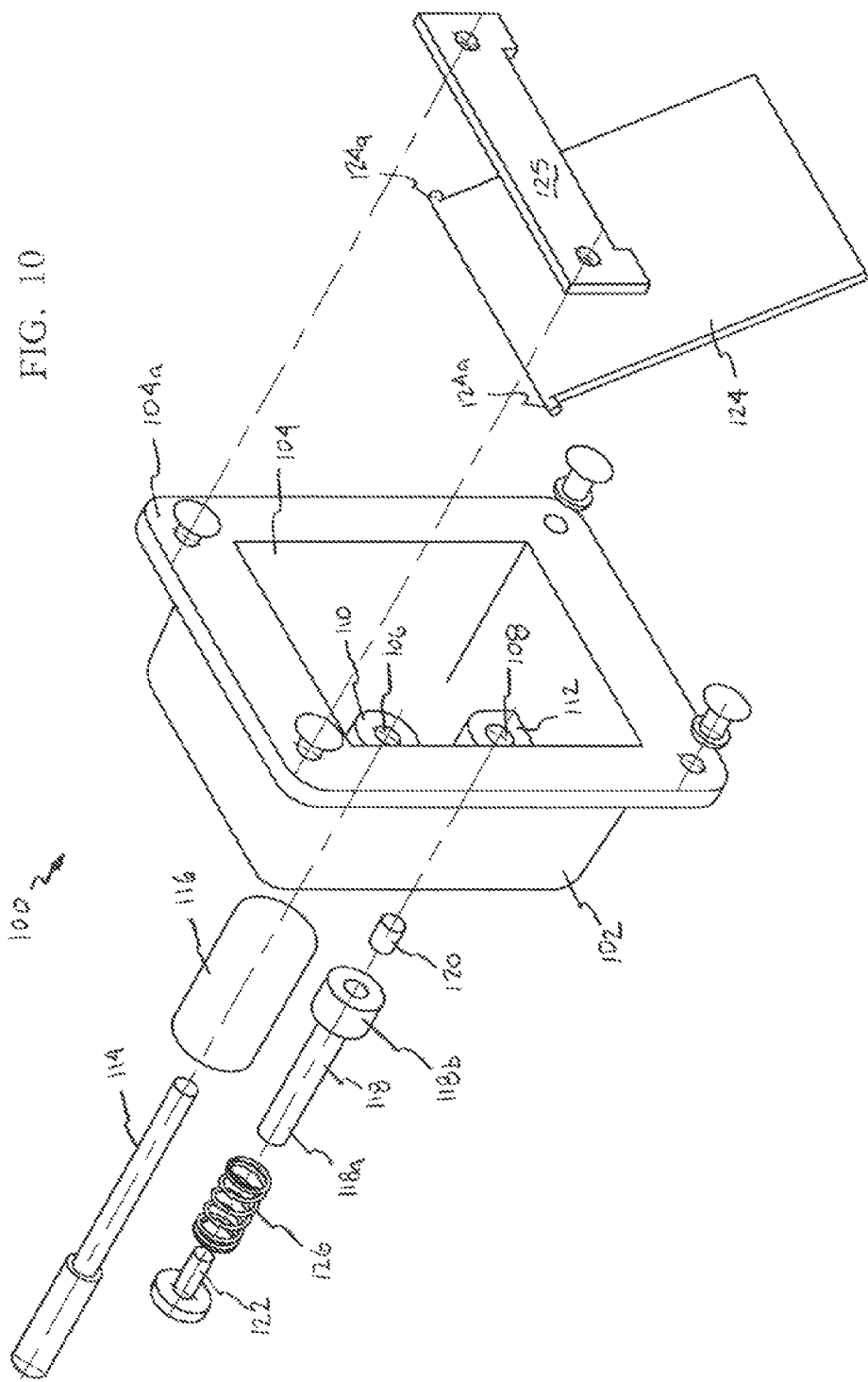
FIG. 10 is an exploded perspective view of the reset mechanism of FIG. 9.
Figure 11:
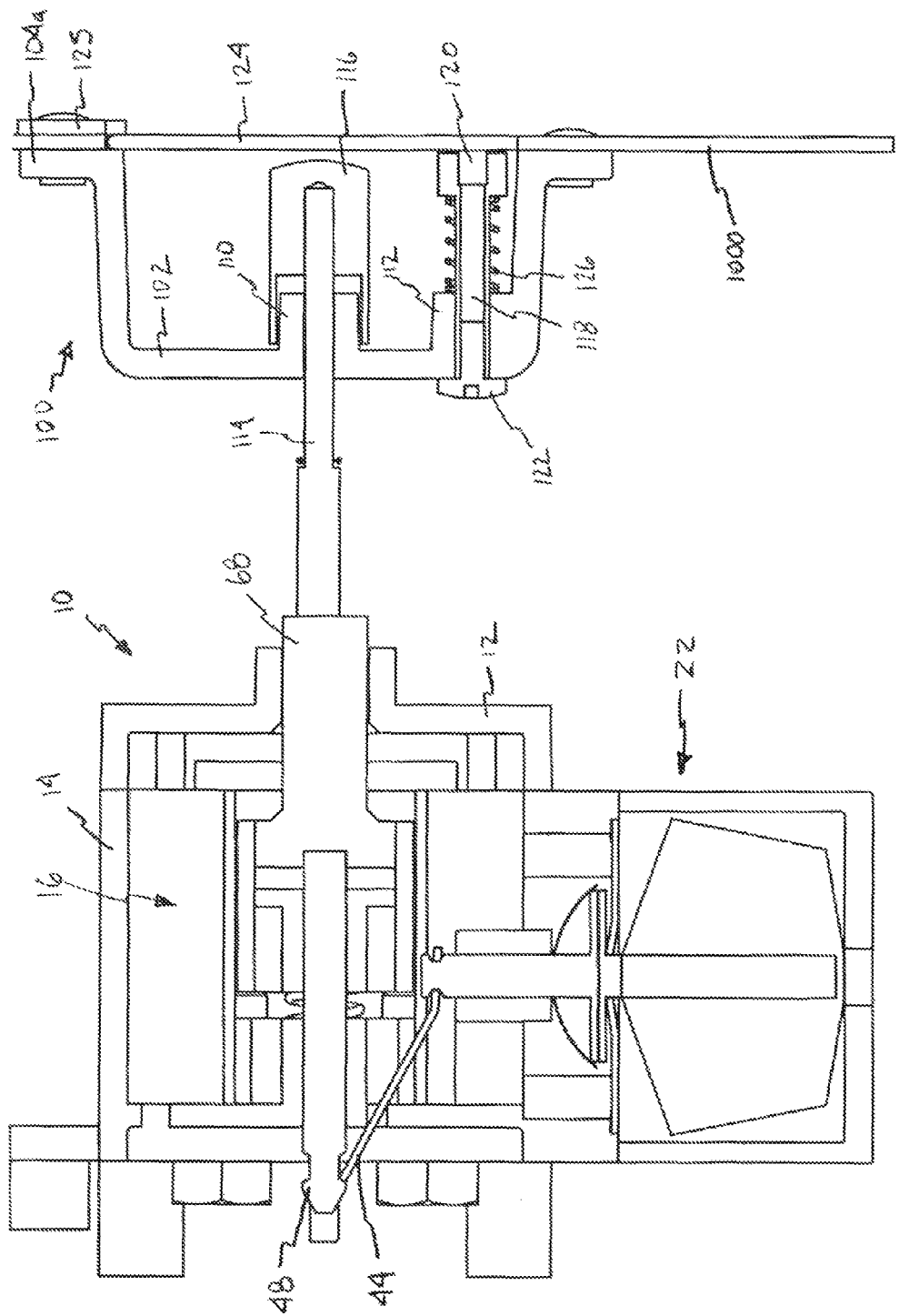
FIG. 11 is a side sectional view of the seismic electrical breaker assembly of FIG. 1 together with the reset mechanism of FIG. 9 in an operational state.
Figure 12A:
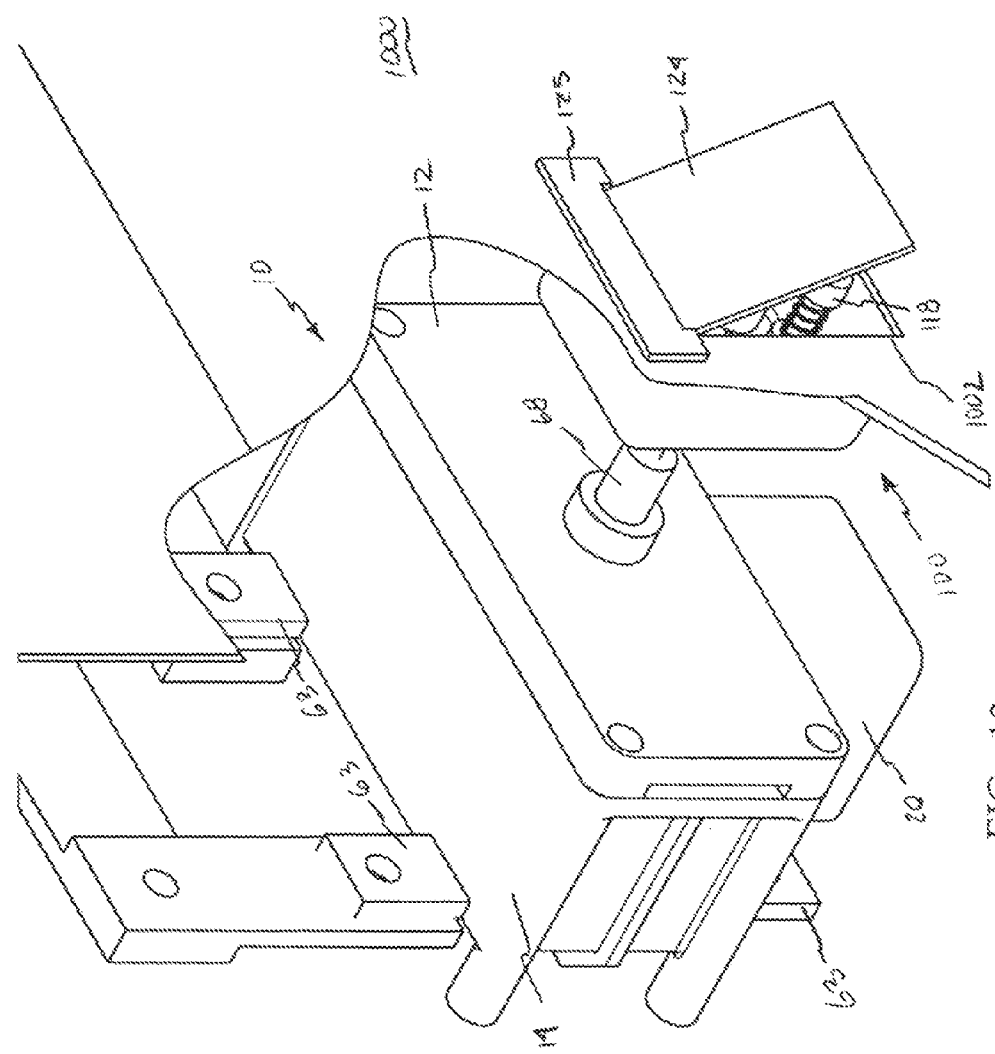
FIG. 12a is a perspective view of the seismic electrical breaker assembly of FIG. 1 together with the reset mechanism of FIG. 9 mounted in an electrical box and in an tripped state.
Figure 12B:
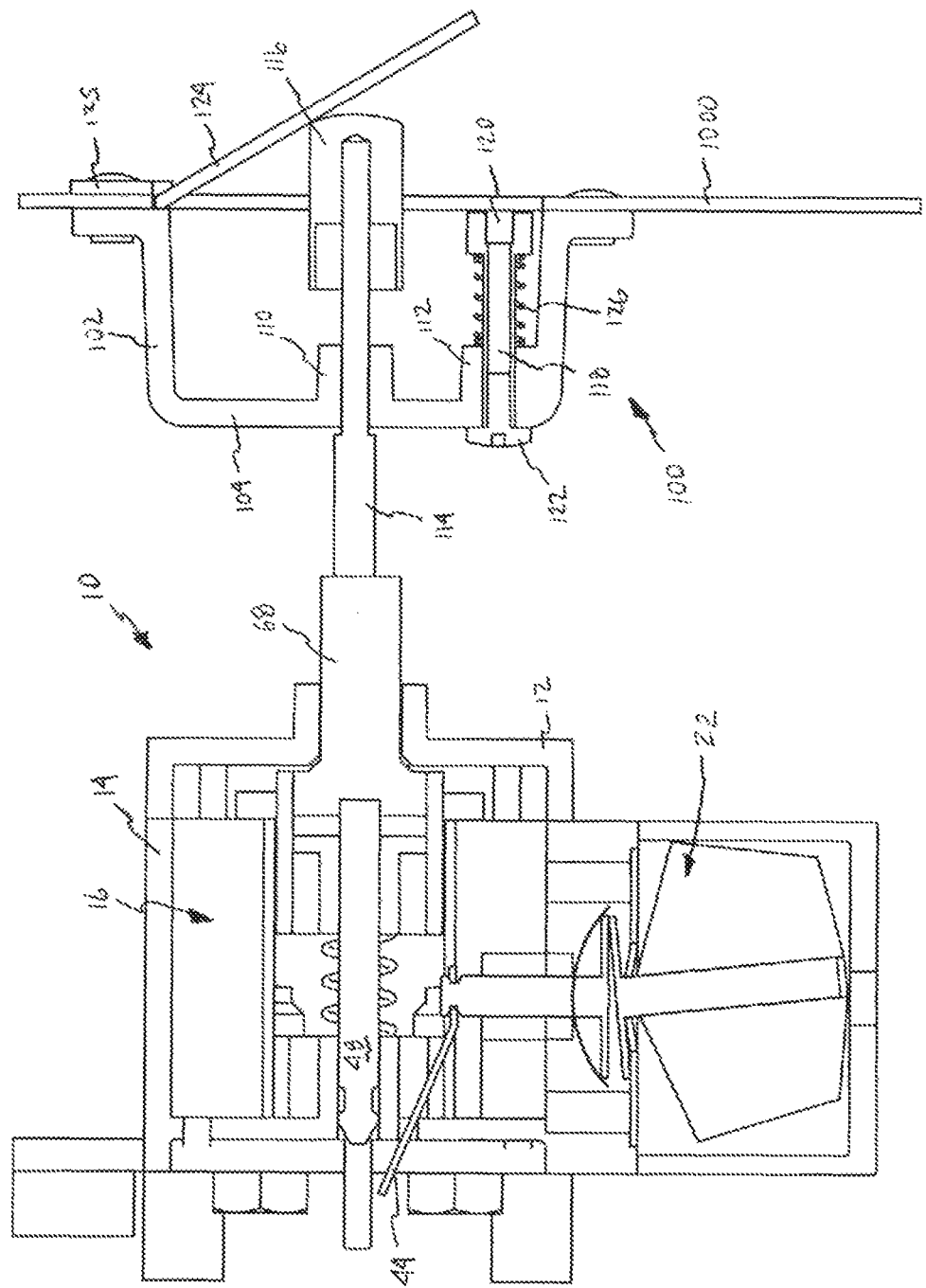
FIG. 12b is a side sectional view of the seismic electrical breaker assembly of FIG. 1 together with the reset mechanism of FIG. 9 in a tripped state.
Figure 13:
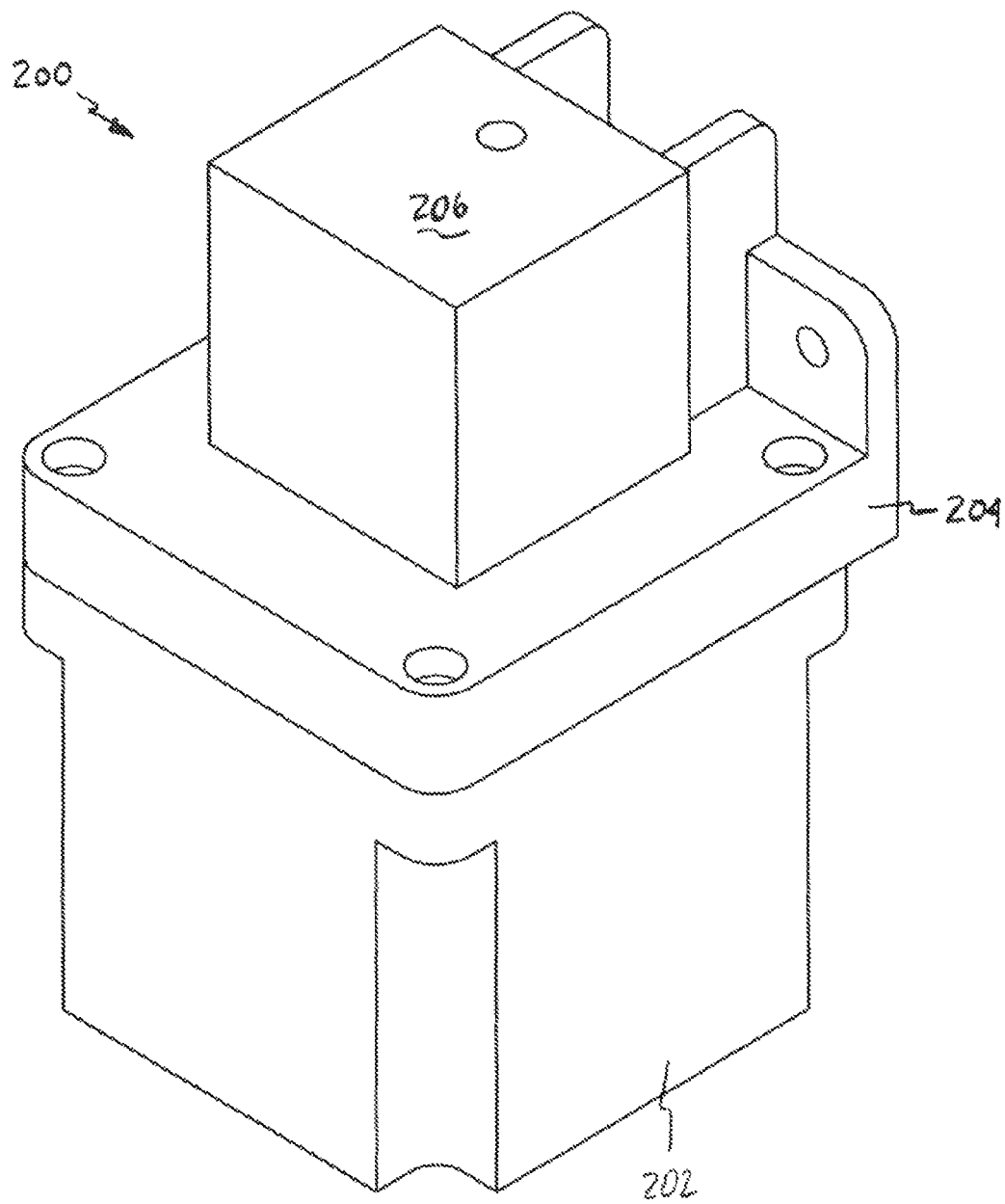
FIG. 13 is a perspective view of a seismic micro-switch assembly in accordance with a preferred embodiment of the present invention.
Figure 14:
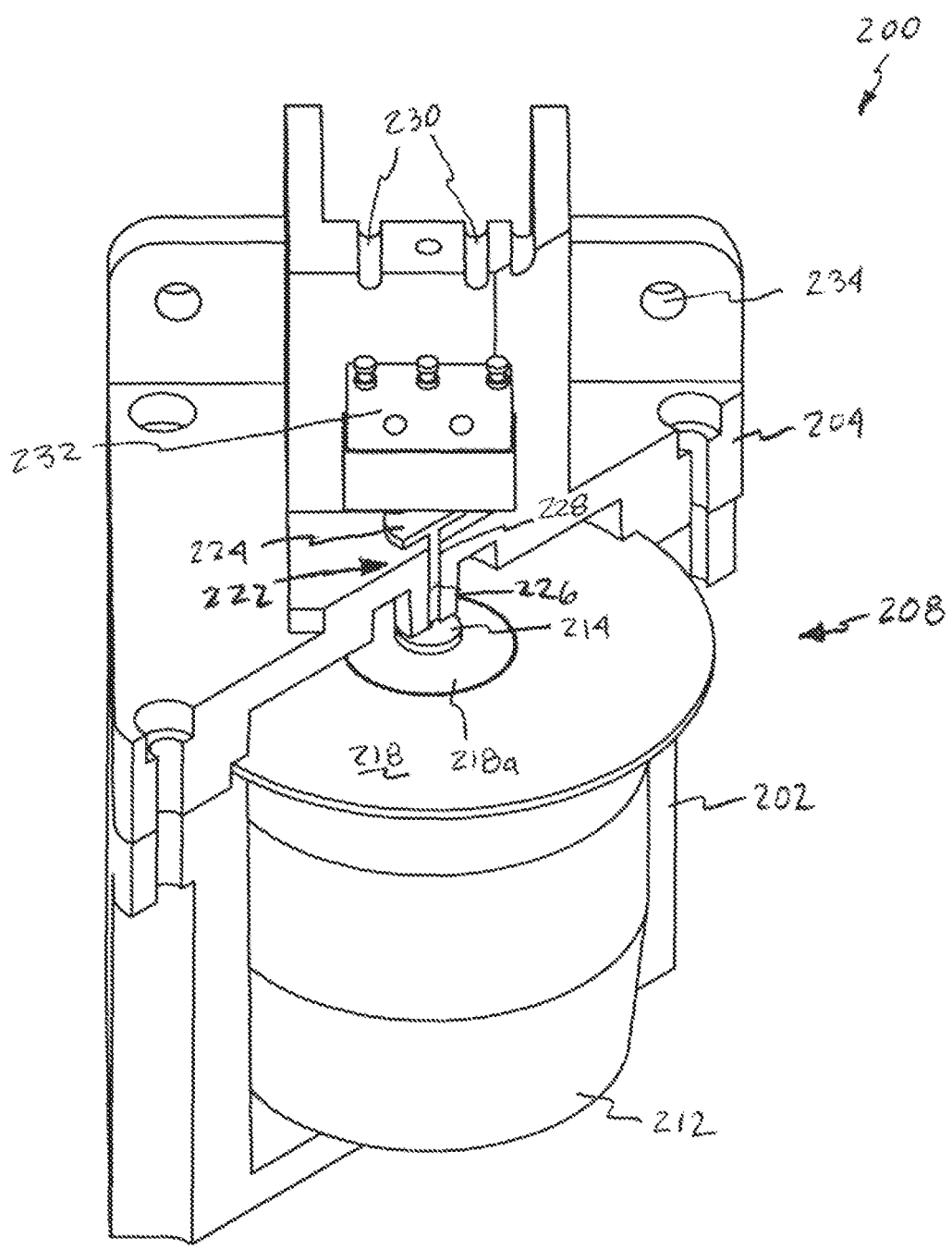
FIG. 14 is a perspective view of the seismic micro-switch assembly of FIG. 12 with a portion of the housing cut away to see the interior.

FIGS. 9-12b show the reset mechanism 100 in accordance with a preferred embodiment of the present invention. As shown in FIGS. 11-12b, the reset mechanism 100 is preferably used in conjunction with the seismic electrical breaker assembly 10 and is secured to the face of a standard electrical box 1000, in which an opening 1002 is cut or otherwise made. In a preferred embodiment, the reset mechanism 100 includes a housing 102 having a front opening 104 and first and second openings 106 and 108 extending through the back thereof. The front opening 102 includes a flange 104a that includes openings therein for securing the housing 102 to a standard electrical box 1000 via threaded fasteners or the like. In a preferred embodiment, the bottom of the housing is angled downwardly toward opening 102 so that water drains out and does not accumulate in the box.

As shown in FIG. 10, the interior of the housing 102 includes bosses 110 and 112 through which openings 106 and 108 are defined. First opening 106 receives a reset pin 114 that has a portion that extends outside of housing 102 and a portion that resides inside housing 102 in the non-actuated or operational state. In a preferred embodiment, the reset pin 114 includes a reset button 116 thereon, as shown in FIG. 11. However, the reset button can be omitted. In another preferred embodiment, the reset pin 114 can include an o-ring 114a for sealing purposes, as shown in FIG. 11. The end of the reset pin 114 that extends through first opening 106 is in contact with contact beam stem 68 of the seismic electrical breaker assembly 10. It will be appreciated by those skilled in the art that the actuator pin 114 can be made different lengths for different box depths.

A holder rod 118 extends through second opening 108. In a preferred embodiment, the holder rod 118 has first and second sections 118a and 118b and a magnet 120 embedded in or otherwise secured to one end thereof. The first section 118a has a smaller diameter than the second section 118b. A coil spring 126 or the like is received on the first section 118a of holder rod 118, as shown in FIG. 11.

In a preferred embodiment, the reset mechanism 100 also includes a trip indicator flap or door 124 that is hingedly connected to the face of the electrical box 1000, as shown in FIG. 11. The flap 124 can be connected by any known method. In a preferred embodiment, the flap includes hinge members 124a that are received in complementary openings or recesses in a flap holder 125 that is secured to the face or panel of the electrical box 1000 such that it covers opening 1002, as shown in FIG. 12a.

In use, as is described above, when seismic electrical breaker assembly 10 is tripped contact beam stem 68 is urged outwardly, or, with reference to FIGS. 11 and 12b, it is urged to the right. When this occurs, the reset pin 114 and button 116 are also urged to the right. This causes reset button 116 to contact and push outwardly and upwardly (due to the hinge) flap 124. This serves at least two purposes. First, it is an indicator that the circuit has been broken. In other words, someone looking at the electrical box 1000 will see that the flap 124 is open and will know that the circuit has been broken by seismic or other activity. The open flap 124 also provides a reset to the circuit by pressing, which pushes the button 116, pin 114, stem 68, beam 60 and trip pin 48 to the left (as shown in the figures). As described above, once second end 44b of lever latch 44 is received into groove 46 the system is reset and the circuit is closed.

Magnet 120 is positioned to hold flap 124 shut, as is shown in FIG. 11. In a preferred embodiment, the spring 126 compresses during reset and then returns the flap 124 to an approximately level or vertical position. In a preferred embodiment, an adjusting screw 122 is threaded into rod end 118a, as shown in FIG. 11. Accordingly, the position of magnet 120 can be adjusted by threading adjusting screw inwardly or outwardly. This aids in positioning and leveling flap 124, as well as providing a tamper proof quality.

Figure 15:
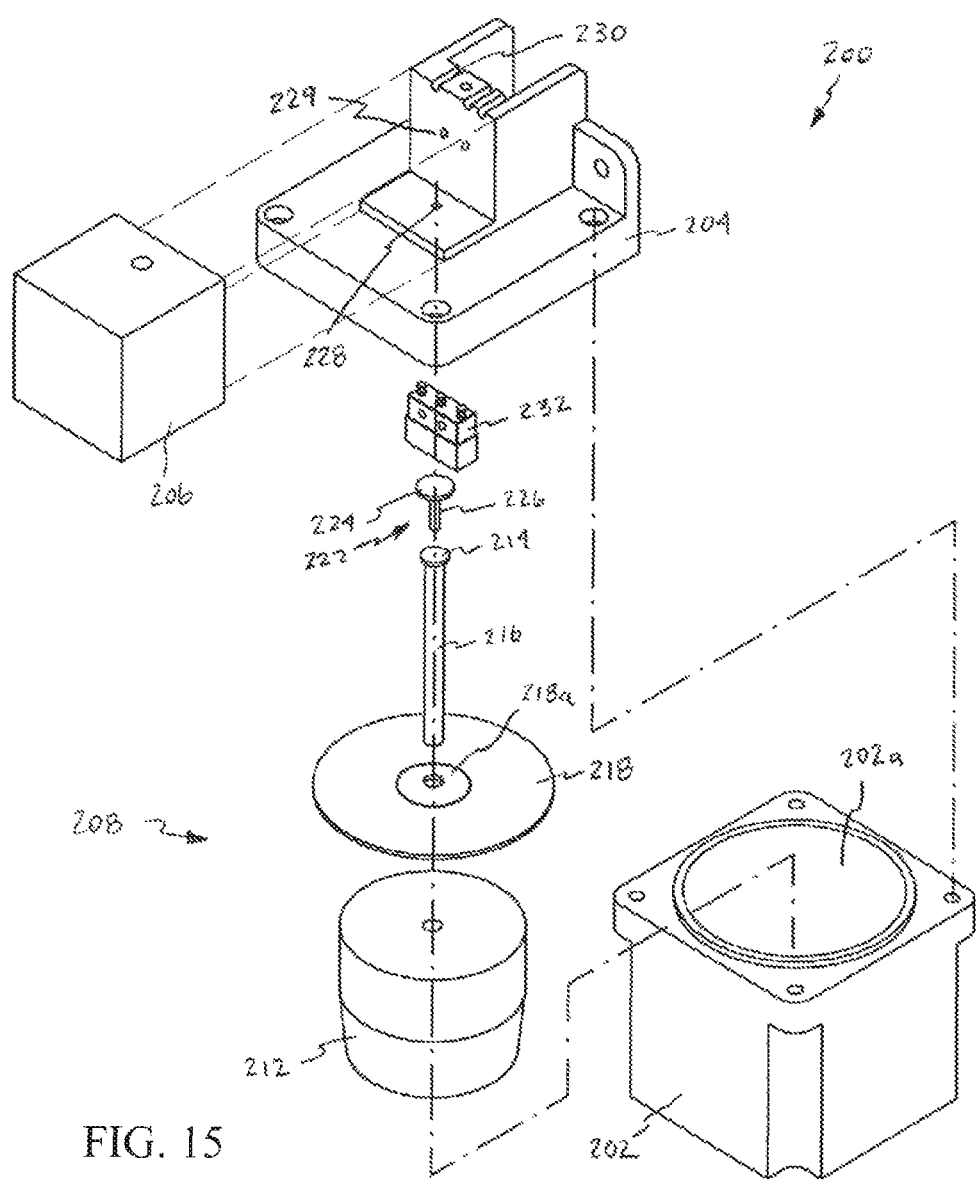
FIG. 15 is an exploded perspective view of the seismic micro-switch assembly of FIG. 13.
Figure 16:
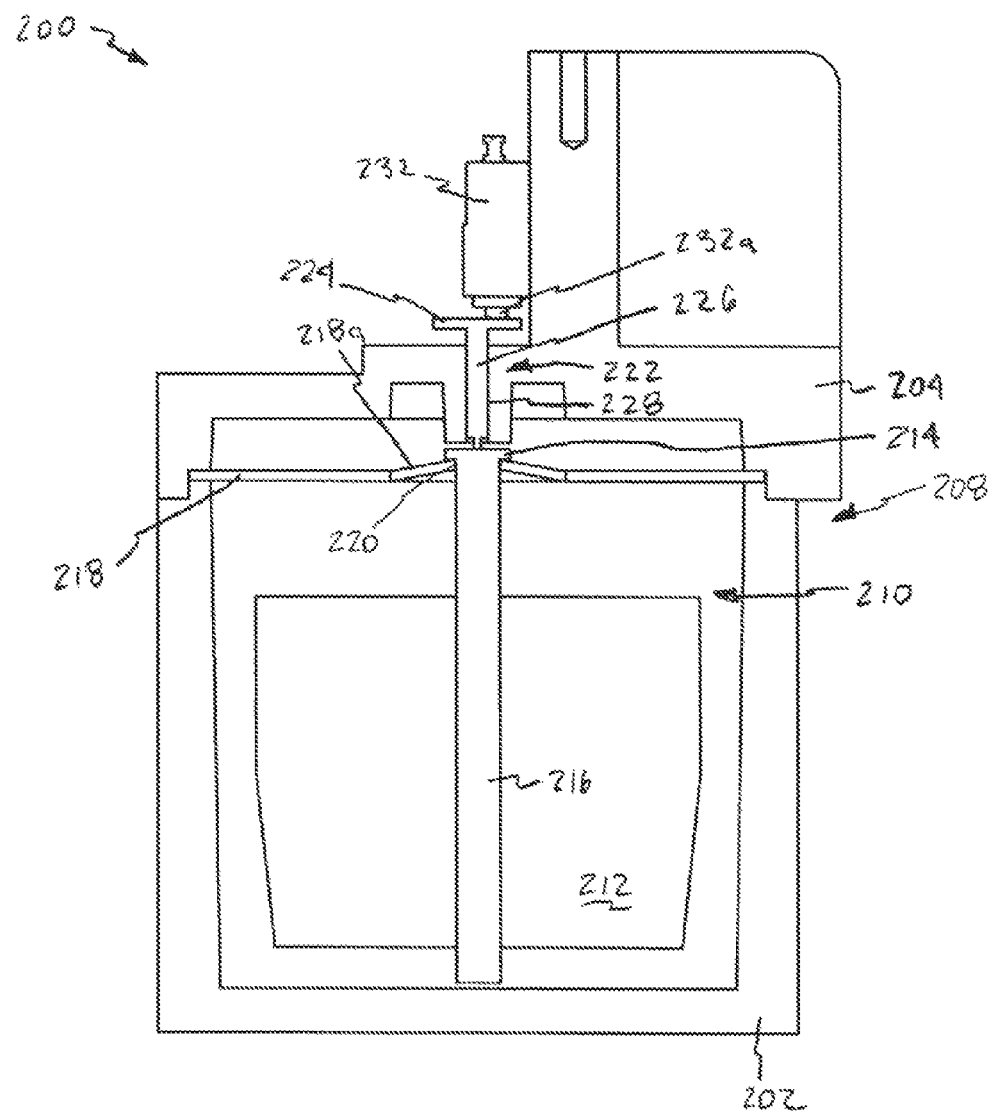
FIG. 16 is a side sectional view of the seismic micro-switch assembly of FIG. 13 showing the micro-switch in an operational state.

FIGS. 13-17 show the seismic actuated micro switch 200. As is best shown in FIG. 15, the device 200 includes a base body or bottom section 202 an upper section 204 and a cover 206 for covering the micro-switch 232 and electrical connections. The bottom section and top sections 202 and 204 cooperate to house a weight and wobble plate assembly 208. The weight and wobble plate assembly 208 includes a first member 210 that includes a weight or pendulum 212 that is connected to a wobble plate/disc or first disc 214 by a first shaft 216 (these components can be unitary or separate pieces joined together). A shelf plate 218 having an opening 220 therein spans the interior 202a of bottom section 202. As shown in FIG. 16, in a preferred embodiment, shelf plate 218 is held in place between bottom and to sections 202 and 204. The shelf plate 218 includes a pivot cone 218a formed thereon through which opening 220 extends. Shaft 216 extends through opening 220 and first disc 214 rests on pivot cone 218a. The weight and wobble plate assembly 208 further includes a second member or actuator pin 222 that comprises a second plate/disc 224 having a second shaft 226 extending downwardly therefrom. The second disc 221 is disposed above top section 204 and second shaft 226 extends downwardly through an opening 228 in top section 204.

Top section 204 includes a micro-switch mounting portion 229; that includes grooves 230 for electrical connection grommets and a micro-switch 232 mounted thereon. The micro-switch can be mounted as desired. In a preferred embodiment it is secured to the micro-switch mounting portion 229 by screws. Micro-switches are known in the art, therefore, a complete description will be omitted. As is shown in FIG. 16, the micro-switch 232 includes a button 232a that when pressed switches the micro-switch 232 on or off, depending on the configuration.

Figure 17:
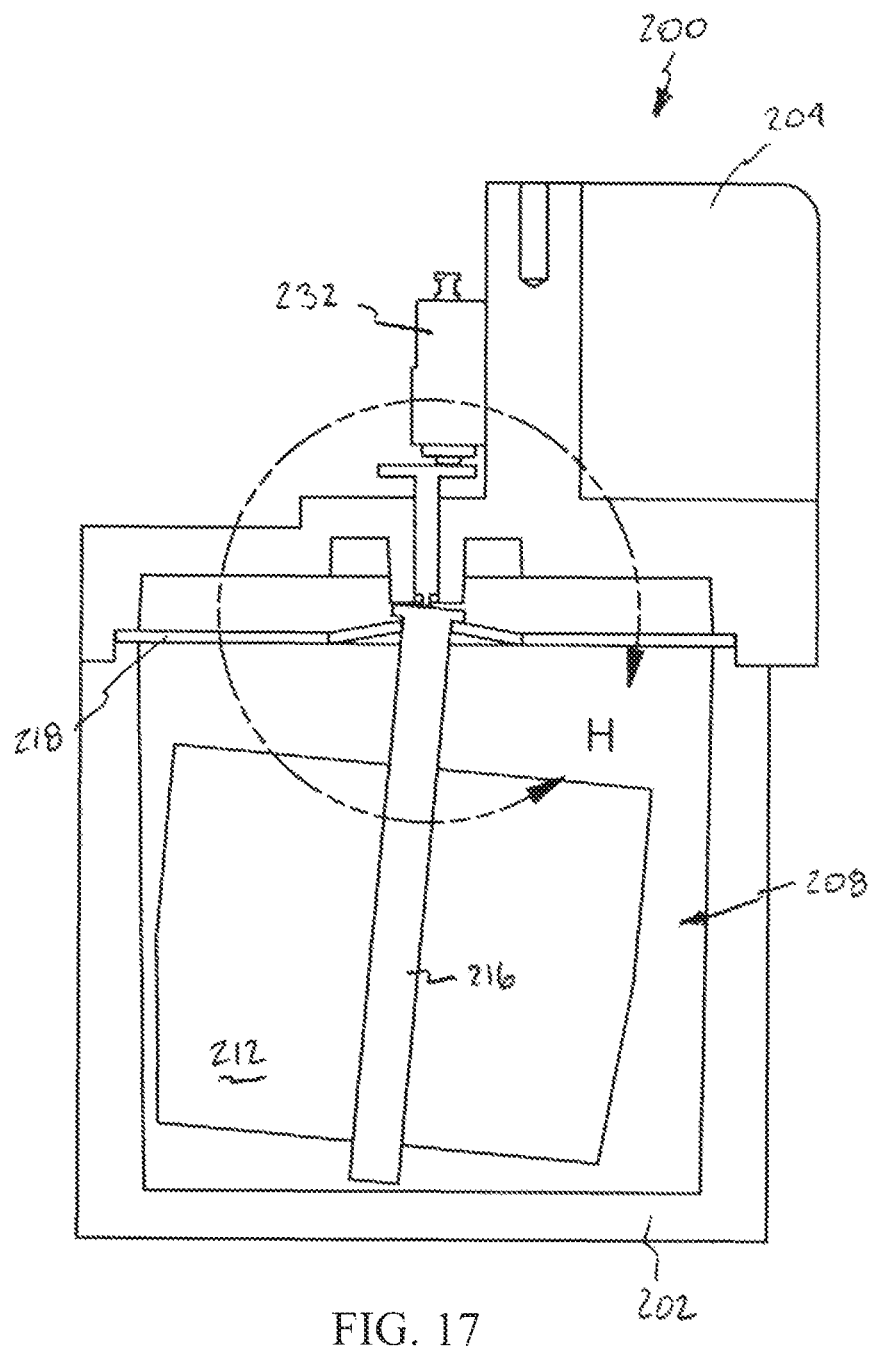
FIG. 17 is a side sectional view of the seismic micro-switch assembly of FIG. 13 showing the micro-switch in a tripped state.
Figure 17A:
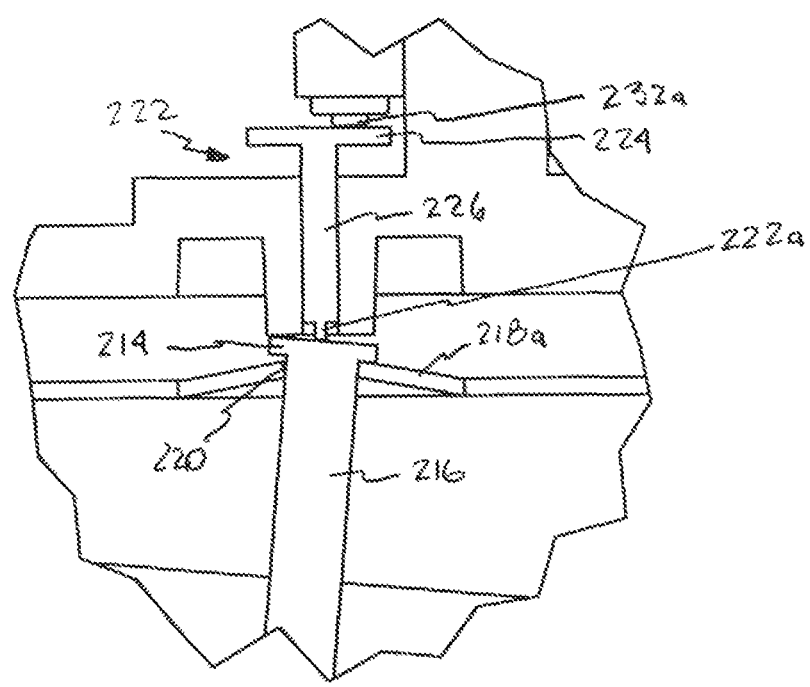
FIG. 17a is a detail view taken from H from FIG. 17.
Figure 18:
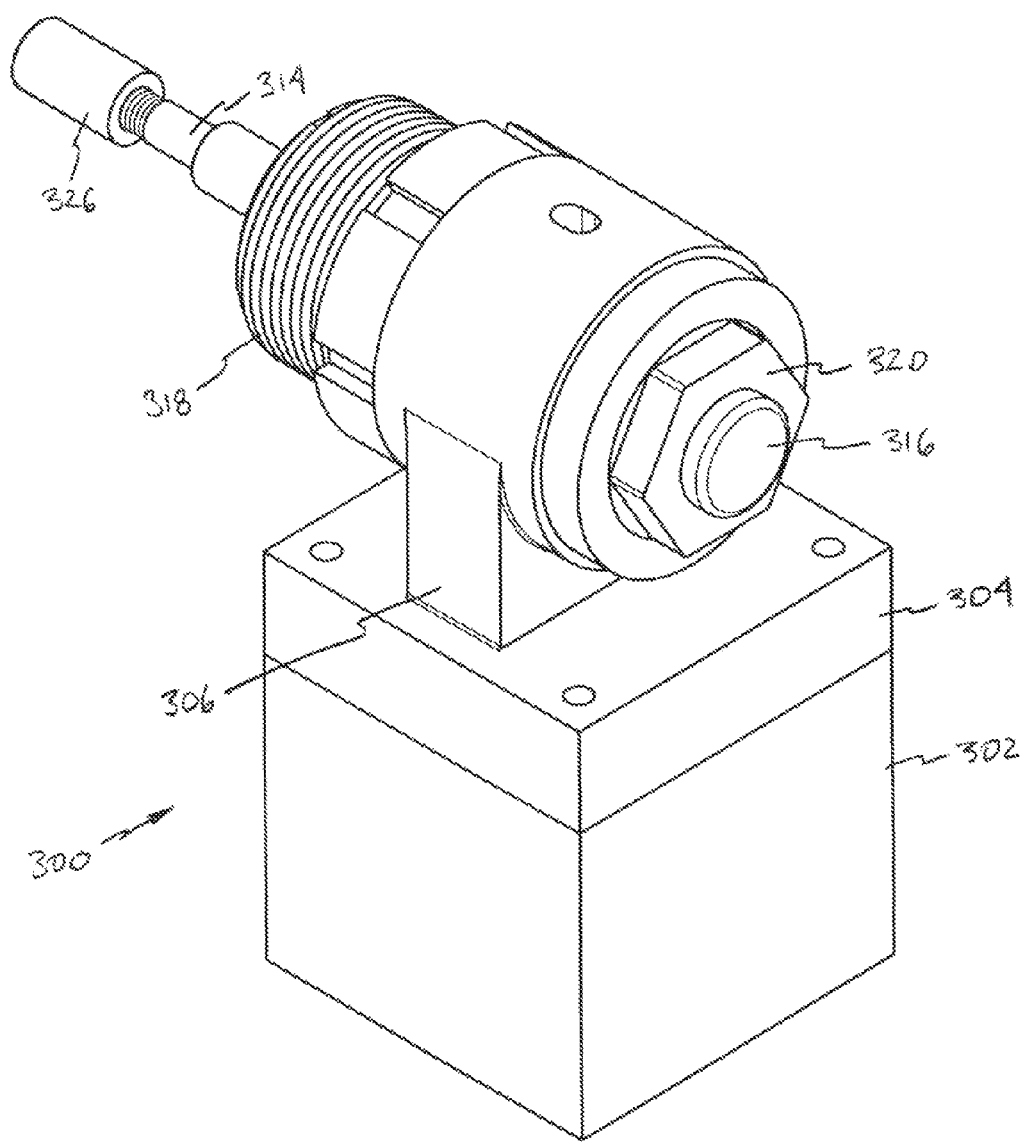
FIG. 18 is a perspective view of a seismic gas valve assembly in accordance with a preferred embodiment of the present invention.

As shown in FIG. 16, in the operational or non-actuated state, first disc 214 rests on pivot cone 218a and weight 212 hangs like a pendulum. The bottom of actuator pin 222 rests on the top of first disc 214. The bottom of actuator pin 222 can include a point portion 222a (not shown in FIG. 14) thereon that has a diameter that is smaller than the second shaft. The point portion 222a is sized to allow very small movement by the actuator pin 222. Those skilled in the art will appreciate that the geometry of the components and desired movement of the button 232a will help determine the size of point portion 222a. As shown in FIG. 17, when an earthquake or any jostling event occurs, the weight swings (in FIG. 17 to the left). Because of the angle between the top surface of pivot cone 218a and the bottom surface of first disc 214, the right side of first disc 214 moves downwardly, thus causing the left side and center of first disc 214 to move upwardly. This, in turn, pushes actuator pin 222 upwardly. The top of actuator pin 222 pushes button 232a upwardly, thereby triggering the micro-switch 232. As will be appreciated by those skilled in the art, the tolerances can be set as desired. In another embodiment, the second disc 224 can be omitted and second shaft 226 can actuate button 232a. In another embodiment, the weight and wobble plate assembly 22 described above can be used, and the second member 222 can be inverted such that the second disc 224 rests on the first disc 214 and the second shaft 226 presses the button 232a. The seismic operated micro switch 200 can be used for operating big contactors into the thousands of amps and or mega watts in power houses, power line, transformers, business, or elsewhere.

The seismic actuated micro switch assembly 200 can also include vertically or horizontally oriented mounting holes 234 for mounting of the assembly 200.

FIGS. 18-23b show the seismic actuated gas shut off valve assembly 300. Preferably, the seismic actuated gas shut off assembly 300 can be retrofitted or used with standard gas regulators, such as the one shown in FIGS. 23a and 23b. It will understood by those skilled in the art that the assembly 300 can be used with other regulators and systems where gas shut off in the event of seismic activity is desired. The assembly 300 includes a bottom cover 302 that houses the weight and wobble plate assembly 22, and a cover 304 with a ring 306 that houses the gas shut off components 308.

The weight and wobble plate assembly 22 includes a first member 24 that includes a weight or pendulum 26 that is connected to a wobble plate/disc or first disc 28 by a first shaft 30. These three parts are preferably a single unit (these components can be formed as a unit or separate pieces joined together). A shelf 32 having an opening 34 (see FIG. 23a) therein spans the interior of bottom cover 302. The shelf 32 includes a pivot cone 32a formed thereon through which opening 34 extends. Shaft 30 extends through opening 34 and first disc 28 rests on pivot cone 32a. The weight and wobble plate assembly 22 further includes a second member 36 that comprises a second plate/disc 38 having a second shaft 40 extending upwardly therefrom through an opening 313 in the bottom of body 304. The second shaft 40 includes a circumferential groove or notch 42 defined near the distal or upper end thereof. A trigger lever latch 44 that includes first and second ends 44a and 44b and a slot 44c defined therein that is received on second shaft 40 at groove 42. Trigger lever latch 44 also includes a first portion 44d and a second portion 44e that extends upwardly at an angle from first portion 44d. The second end 44b of trigger lever latch 44 is received in a groove 310 on a sleeve 312 that will be described more fully below. In a preferred embodiment, groove 310 in sleeve 312 includes an engagement surface 310a against which second end 44b of trigger lever latch 44 engages in the operational state.

As shown in FIG. 21b, in the operational or non-actuated state, first disc 28 rests on pivot cone 32a and weight 26 hangs like a pendulum. Second disc 38 rests on first disc 28 and second shaft 40 extends upwardly through opening 313 in top cover 304, ring 306 and insert 318. It will be understood by those skilled in the art that ring 306, insert 318 and any other components herein that "house" pin 314, trigger lever latch 44 and associated components may be referred to herein together as a housing. As shown in FIG. 22b, when an earthquake or any jostling event occurs, the weight swings (in FIG. 22b to the right). Because of the angle between the top surface of pivot cone 32a and the bottom surface of first disc 28, the right side of first disc 28 moves upwardly, thus causing the left side of first disc 28 to move upwardly. This, in turn, pushes second disc 38, second shaft 40, and the first portion 44d of trigger lever latch 44 upwardly. Because of the angle between the first and second portions 44d and 44e of trigger lever latch 44, when the first end 44a moves upwardly, the second end 44b moves downwardly, thus disengaging second end 44b from angular surface 310a, thus tripping sleeve 312 and a pin 314 and button 316 as described below. As with the embodiment above, surface 310a can have a different angle with respect to the pin 314 axis than the second end 44b of trigger lever latch 44. In another embodiment, tripping sleeve 312 can be omitted and the engagement surface can be defined in pin 314.

In a preferred embodiment, the weight and wobble plate assembly 22 also includes an arc shaped leaf spring 50 received on shaft 40 that is positioned between second disc 38 and the bottom of body 304. The leaf spring helps engage the second end 44b of lever latch 44 into groove 310 with sufficient force to produce the desired predetermined seismic tripping level. The overhang of the leaf spring 50 over the second plate 38 helps counteract friction and maintain repeatability. However, the overhang is not necessary. In an alternative embodiment, the leaf spring can be omitted.

As shown in FIG. 19, ring 306 receives a two piece threaded insert sleeve 318 and a retainer nut 320 that are preferably threaded together, as shown in the figures. The threaded insert sleeve 318 and retainer nut 320 cooperate to house the spring sleeve 312 and other components. Spring sleeve 312 has pin 314 extending axially therethrough and has a spring 322 received thereon. The first end 314a of pin 314 is positioned outside of spring sleeve 312 and has reset button 316 received thereon (which is housed in retainer nut 320). In a preferred embodiment, the first end 314a of pin 314 is configured to be engaged by an alien or hex wrench (described below). However, this is not a limitation on the present invention. As shown in FIG. 21b, spring sleeve 312 includes a flange 312a that abuts a flange 316a on the reset button 316, which extends outside of retainer nut 320. In a preferred embodiment, retainer nut 320 includes a ring seal 324.

Figure 23A:
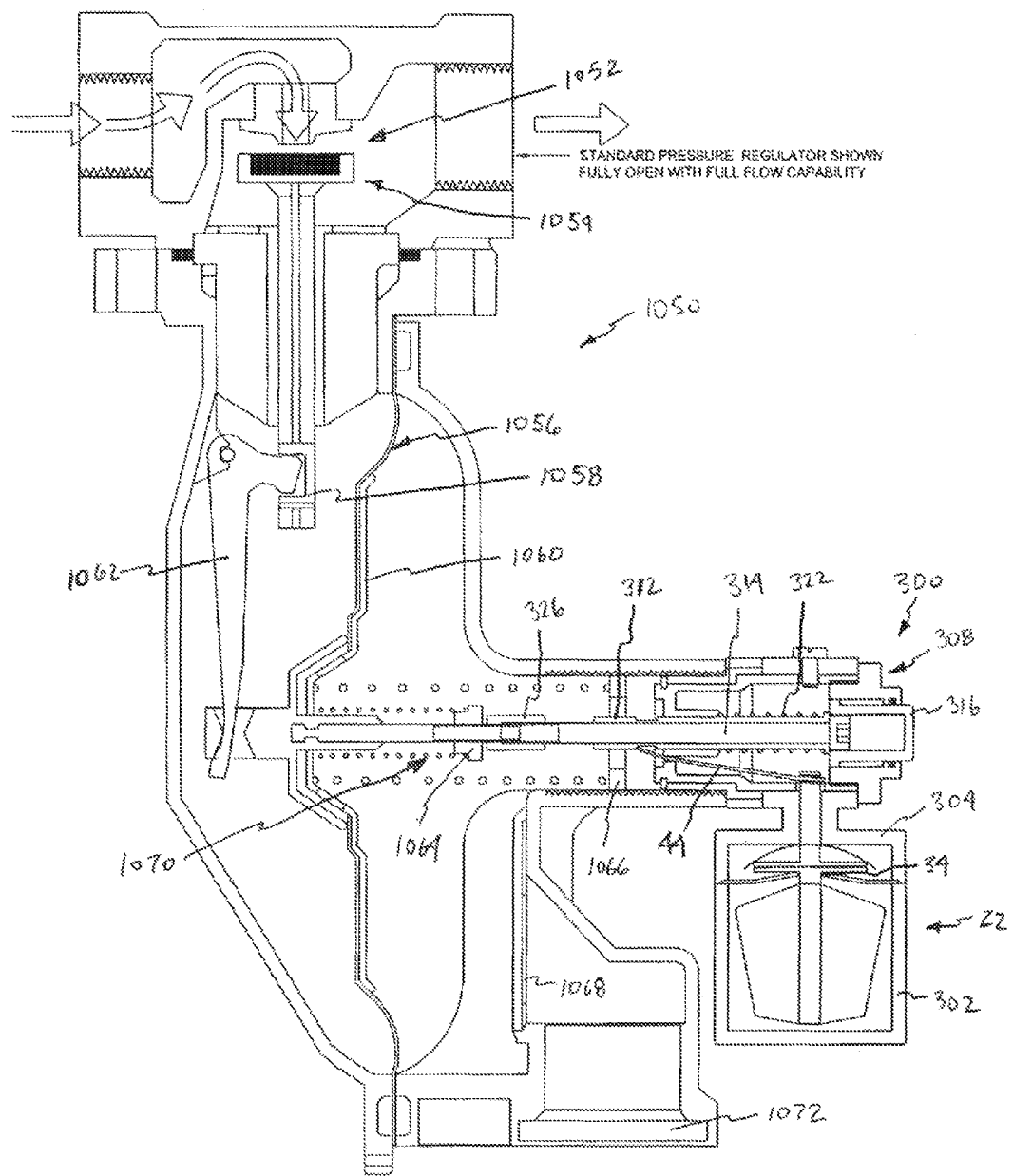
FIG. 23a is a side sectional view of the seismic gas valve assembly of FIG. 18 together with a gas regulator and showing the valve in an open or operational state.
Figure 23B:
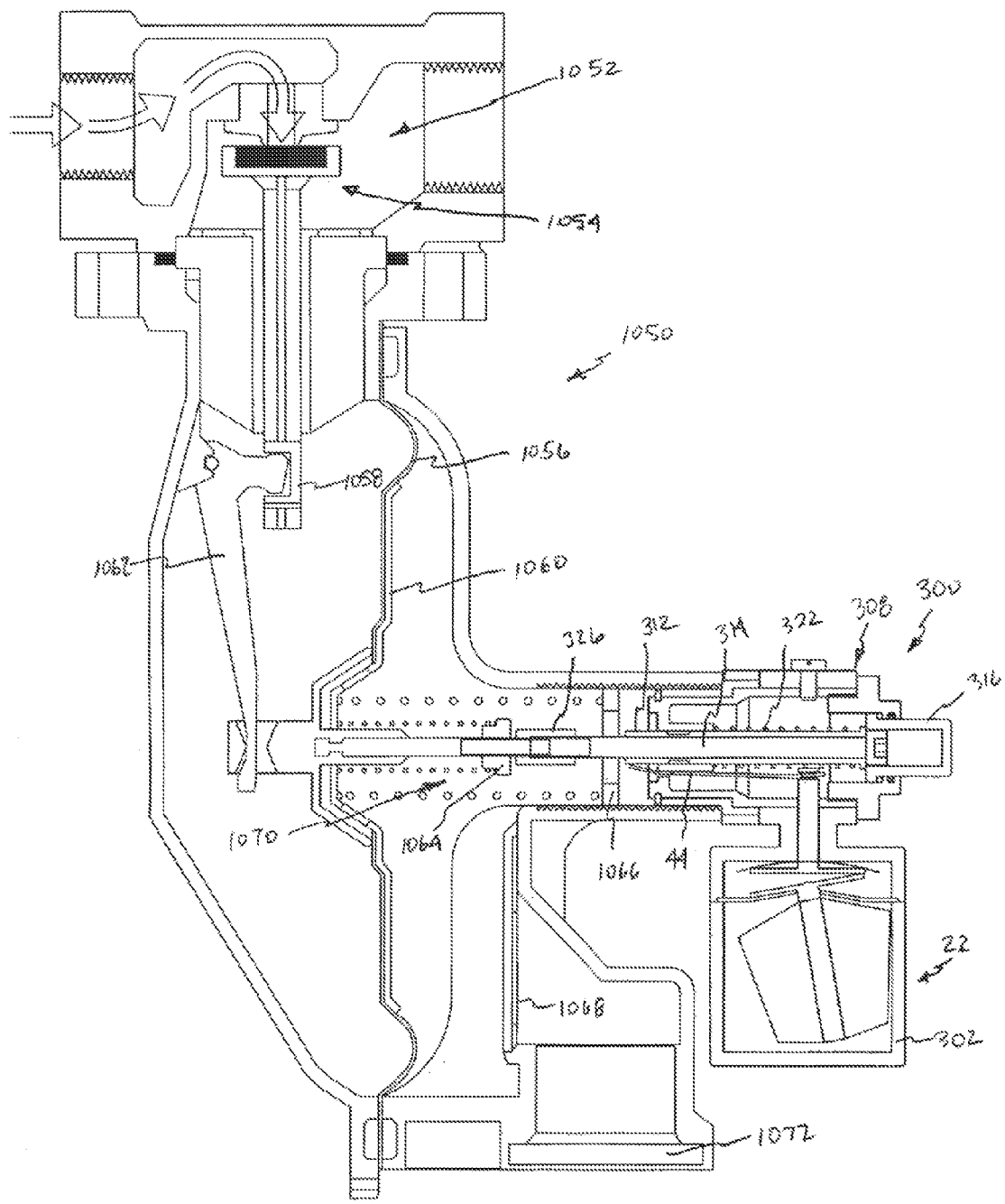
FIG. 23b is a side sectional view of the seismic gas valve assembly of FIG. 18 together with a gas regulator and showing the valve in a closed or tripped state.

The second end 314b of pin 314 is threaded and receives a threaded bushing 326 thereon. As shown in FIGS. 23a and 23b, the threaded bushing 326 is connected to the diaphragm of the gas regulator (described more fully below).

During assembly, as will be appreciated by those skilled in the art, the threaded insert sleeve 318, a sleeve retainer slotted nut portion 318a of which is slotted for tightening purposes, and allows the bottom cover 302 to rotate to a bottom position before tightening the reset button retainer nut 320. In a preferred embodiment, the assembly includes a spring retainer clip 328 for preventing the slotted portion of the threaded insert sleeve 318 from coming unscrewed. The assembly also includes a screw 330 that is received in openings in the ring 306 and threaded insert sleeve 318 that holds these components in alignment and prevents any rotation.

As is shown in FIG. 21b, the spring 322 extends between flange 312a and a boss 332 in the threaded insert sleeve 318. The spring 322 is selected to have more force than the main pressure regulator spring that closes the valve seat and blocks the flow of gas. In a preferred embodiment, the spring 322 provides 25% or more force than the main pressure regulator spring. Also, as is shown in FIG. 21b, trigger lever latch 44 extends through a narrow opening 331 in threaded insert sleeve 318, just below boss 332. This narrow opening 331 helps maintain repeatability by holding trigger lever latch 44 in position in the triggered state so that when the reset button is pushed, the trigger lever latch 44 once again engages groove 310 and holds the sleeve 312 in the operational state.

It will be understood that the gas regulator 1050 shown FIGS. 23a and 23b is a standard gas regulator. The regulator includes a regulator orifice body 1052, a flexible valve seat 1054 (shown in an open position in FIG. 23a and a closed position in FIG. 23b), a flexible diaphragm 1056, an actuator shaft 1058, a diaphragm support plate 1060, a valve seat actuator arm 1062, a pressure relief spring retainer adjustment mechanism 1064, a pressure adjustment ring 1066, a spring vent flap 1068 (which is normally closed), a diaphragm pin 1070 and a wire mesh screen 1072, among other standard components. FIG. 23a shows the standard pressure regulator 1050 fully open and with full flow capability. The gas regulator 1050 maintains regulated pressure regardless of spikes in the main line. The standard relief valve opens when the pressure peaks are too high in the main line allowing as to vent through the wire mesh screen 1072 and to the atmosphere.

An exemplary set of instructions for installing the seismic actuated gas shut off valve assembly 300 on a standard pressure regulator 1050 is as follows. With the gas on, unscrew the plastic plug from the regulator 1050. Screw in the assembly 300 via the rotatable nut 318a on the threaded insert sleeve 318 (using the slots) into the interior threaded of the regulator 1050. Tighten the nut 318a. Position the body with the weight 26 in the down position. Remove the button 316 and retaining nut 320 Using an alien wrench or fingers, press in and turn clockwise until the bushing 326 connects to the diaphragm. Lightly tighten with an alien wrench. Replace the retaining nut 320 and the reset button 316 and tighten firmly. Position the reset button 316 in the in position. In the exemplary embodiment, the gas must remain on through the installation procedure. This is not a limitation however. It will be understood that pin 314 slides freely inside of spring sleeve 312 without restricting the diaphragm travel in any way. During assembly, when the bushing 326 contacts the regulator diaphragm sleeve, the diaphragm continues moving and opens the relief valve, thereby maintaining a preset pressure.

In operation, when the weight 26 swings, as described above and the second end 44b of trigger lever latch 44 is unseated from groove 310, because spring 322 has a higher spring constant or exerts more force than the main pressure regulator spring in the regulator 1050, the spring 322 pushes the sleeve 312, pin 314 and button 316 away from the regulator 1050 (to the right in FIGS. 23a and 23b), which closes the valve seat and blocks or shuts off the flow of gas. To reset the mechanism, a user pushes on button 316, which will once again seat the second end 44b of trigger lever latch 44 in groove 310 and against angular surface 310a. As described above, trigger lever latch 44 extends through opening 331, which holds in place before being reset.

As described above, the assembly 300 is a seismic actuator capable of shutting off gas flow within a gas line in the event of seismic activity. However, it is contemplated that the present invention be used to initiate various actions and/or change the state of various systems, such as for actuating any of various mechanical operations. Additionally, the present invention can be used in residential homes and may also have industrial applications.

It will be understood that the seismic activity threshold at which the assemblies described above are tripped may be varied by varying the size of the weights, raising or lowering the weights/pendulums or by other methods. Those of skill in the art will appreciate that the seismic actuators according to the present invention may activate or deactivate electrical circuits, gas regulators, micro-switches and the like in other ways.

In a still further embodiment (not shown), the seismic actuators according to the present invention may act as a mechanical switch. In such an embodiment, a weight or volume of fluid may be stored at first point representing a higher potential energy position with respect to a second point. Switching of the seismic actuator from an open to a closed state may initiate movement of the weight or volume of fluid from the first point to the second point. Upon such movement, the potential energy in the system may be used to perform certain activities, such as for example turning fly wheel. It is understood that the seismic actuators according to the present invention may be used to activate and/or change various other electrical and mechanical systems in further embodiments.

Figure 24A:
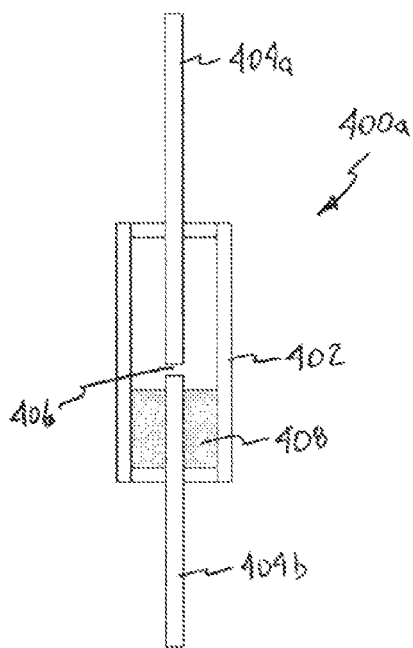
FIG. 24a is a schematic view of a normally open insulated mercury seismic switch.
Figure 24B:
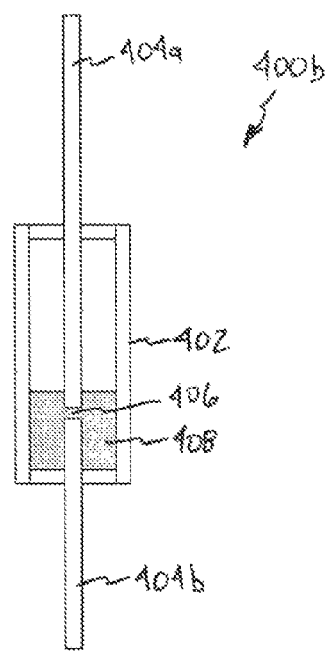
FIG. 24b is a schematic view of a normally closed insulated mercury seismic switch.

FIGS. 24a-26 show further embodiments of the present invention that are seismic mercury switches. The actuators shown in FIGS. 24a-25b are used with circuit boards. FIGS. 24a and 24b show normally open and normally closed insulated seismic switches 400a and 400b that each include an insulated shell 402 having top and bottom electrodes 404a and 404b extending therethrough that are separated by a gap 406. The insulated shell 402 includes a predetermined amount of mercury 408 therein.

The switch 400a or 400b must be mounted vertically to function. The mercury height is set at a predetermined level as desired. The mercury level or height determines the g-forces or seismic activity necessary to make (normally open switch 400a) or break (normally closed switch 400b) the circuit. Therefore, in switch 400a, when seismic activity reaches a threshold level, g-forces will cause the mercury 408 to bridge the gap 406, thereby closing or completing the circuit. In switch 400b, when seismic activity reaches a threshold level, g-forces will cause the mercury 408 to move such that it does not bridge gap 406 any longer, thereby opening and shutting off the circuit. It will be understood that vertical movement achieves the same effect.

The insulated shell 402 can be made of any suitable non conducting material, such as glasses. For example, it can be constructed similar to a fuse with glass and metal ends or glass sealed around electrodes at each end.

Figure 25A:
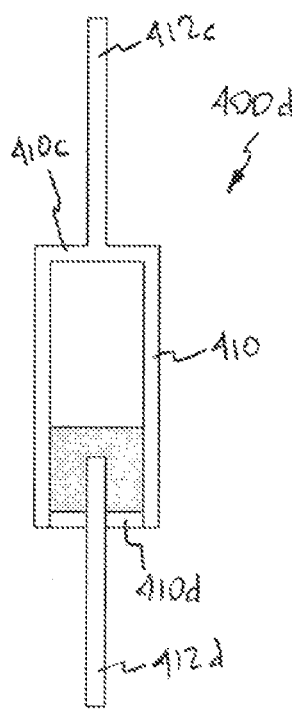
FIG. 25a is a schematic view of a normally open metal mercury seismic switch.
Figure 25B:
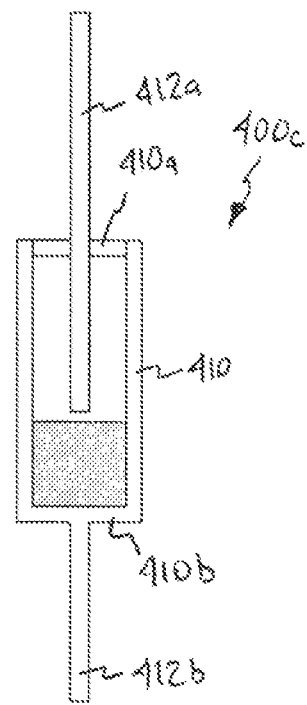
FIG. 25b is a schematic view of a normally closed metal mercury seismic switch.

FIGS. 25a and 25b show normally open and normally closed metal seismic switches 400c and 400d. Normally open metal seismic switch 400c includes a metal or body 410 with a top insulated end 410a having an electrode 412a extending therethrough and a bottom metal end 410b having an electrode 412b extending therefrom. The metal shell 410 includes a predetermined amount of mercury 408 therein.

Normally closed metal seismic switch 400d includes a metal shell 410 with a top metal end 410c having an electrode 412c extending therefrom and a bottom insulated end 410d having an electrode 412d extending therethrough. The metal shell 410 includes a predetermined amount of mercury 408 therein.

The switch 400a or 400b must be mounted vertically to function. The mercury height is set at a predetermined level as desired. The mercury level or height determines the g-forces or seismic activity necessary to make (normally open switch 400c) or break (normally closed switch 400d) the circuit. Therefore, in switch 400c, when seismic activity reaches a threshold level, g-forces will cause the mercury 408 to move to the side and upwardly until it contacts electrode 412a, thereby closing or completing the circuit. In switch 400d, when seismic activity reaches a threshold level, g-forces will cause the mercury 408 to move to the side and upwardly such that it does not contact electrode 412d any longer, thereby opening and shutting off the circuit. It will be understood that vertical movement achieves the same effect. The outer metal 140 may be made of any suitable conducting material.

The switches 400a, 400b, 400c and 400d can be made any desired size for different current carrying capacities and are preferably directed to circuit board applications. However, this is not a limitation on the present invention.

Figure 26:
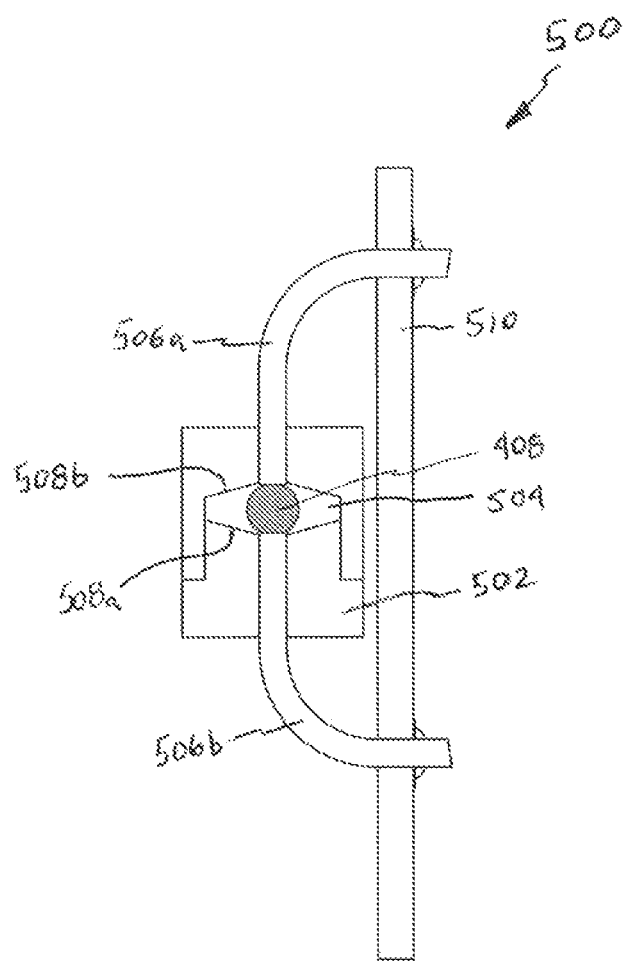
FIG. 26 is a schematic view of a normally closed mercury seismic switch mounted on a circuit board.

FIG. 26 shows a preferred embodiment of another seismic actuator 500 that uses mercury 408. The actuator 500 includes a non-conductive plastic body 502 having an opening or interior 504 defined therein and two (upper and lower) conducting wires 506a and 506b extending out of the body 502 that are separated by a gap (which is part of opening 504). The plastic body 502 can be formed of two pieces that are welded or otherwise sealed together by epoxy or the like. In another embodiment, the body 502 can be formed as a single piece. Opening 504 is defined by the separated ends of wires 506a and 506b and top and bottom angled surfaces or ramps 508a and 508b. In operational mode, a ball of mercury 408 bridges the gap between and electrically connects the separated ends of wires 506a and 506b, as shown in FIG. 26. The mercury 408 falls to the bottom of the lowest point formed by the bottom angled surfaces 508a. When a jostling event occurs, the mercury 408 is forced up ramp 408a and breaks the electrical connection between the ends of the two wires 506a and 506b. As will be appreciated by one of ordinary skill in the art, the angle of the ramp 508a determines the G-forces necessary to break the circuit. The actuator or switch 500 can be actuated by G-forces in any direction (360°, up or down).

The actuator 500 can be used in any application where a seismic switch is needed. FIG. 26 shows the switch 500 mounted on a circuit board 510 into which the wires 506a and 506b are soldered. Also, the switch 500 shown in FIG. 26 is a normally closed switch. To create a normally open switch, switch 500 can be modified to where movement of the mercury 408 up ramp 508a bridges a gap between two connecting wires.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Description of the Preferred Embodiments.

While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An actuator comprising:
   a shelf that includes a pivot cone having an opening defined therein,
   a first member that includes
       a weight movable between an operational state and a tripped state,
       a first shaft extending upwardly from the weight and through the opening in the pivot cone, and
       a first plate affixed to the first shaft, wherein the first plate is supported by the pivot cone,
   a second member that includes
       a second plate in contact with the first plate, and
       a second shaft extending upwardly from the second plate,
   a trigger lever latch having first and second ends, a first portion operatively associated with the second shaft and a second portion extending upwardly at an angle away from the first portion, and
   a trigger pin that defines an axis and has an engagement surface defined thereon, wherein the trigger pin is movable between an operational state and a tripped state, wherein the trigger pin is biased toward the tripped state, and wherein the second end of the trigger lever latch is engaged with the engagement surface to hold the trigger pin in the operational state,
   whereby movement of the weight from the operational state to the tripped state moves the second end of the trigger lever latch downwardly and out of engagement with the engagement surface, and the trigger pin is biased to the tripped state.

2. The actuator of claim 1 further comprising a housing and a bottom cover, wherein the shelf is supported by the bottom cover, wherein the first member is positioned in the bottom cover, the trigger pin and trigger lever latch are positioned in the housing, and the second shaft extends between the bottom cover and the housing.

3. The actuator of claim 2 wherein the housing includes an opening through which the second portion of the trigger lever latch extends, wherein the opening is at least partially defined by a surface, and wherein the second portion of the trigger lever latch rests on the surface when the trigger pin is in the tripped state.

4. The actuator of claim 3 wherein the second shaft includes a groove defined therein and the first portion of the trigger lever latch includes a slot defined therein, and wherein the slot is received in the groove.

5. The actuator of claim 3 wherein the second member further comprises a leaf spring having an opening defined therein, wherein the second shaft extends through the opening in the leaf spring, and wherein the leaf spring biases the second plate to an operational state.

6. The actuator of claim 1 wherein the engagement surface defines a first angle with respect to the trigger pin axis, the second end of the trigger lever latch defines a second angle with respect to the trigger pin axis, and the first and second angles are different.

7. A method that occurs in the event of seismic activity, the method including steps of:
   providing an actuator that includes
       a first member comprising a weight movable between an operational state and a tripped state, a first shaft extending upwardly from the weight, and a first plate affixed to the first shaft,
       a second member that comprising a second plate supported by the first plate, and a second shaft extending upwardly from the second plate,
       a trigger lever latch having first and second ends, a first portion operatively associated with the second shaft and a second portion extending upwardly at an angle away from the first portion, and
       a trigger pin movable between an operational state and tripped state, and biased toward the tripped state, wherein the second end of the trigger lever latch is engaged with the trigger pin,
   moving the weight from the operational state to the tripped state via seismic activity,
   moving at least a portion of the first plate upwardly,
   moving the second plate upwardly,
   moving the first end of the trigger lever latch upwardly,
   moving the second end of the trigger lever latch downwardly, thereby disengaging the second end of the trigger lever latch from the trigger pin, and
   moving the trigger pin from the operational state to the tripped state.

8. The method of claim 7 wherein the method includes the step of opening a circuit when the trigger pin is moved from the operational state to the tripped state.

9. The method of claim 7 wherein the method includes the step of stopping a flow of gas when the trigger pin is moved from the operational state to the tripped state.

10. A seismic actuated circuit breaker assembly comprising:
    a housing having a bottom cover extending downwardly therefrom, circuit breaking components disposed in the housing, wherein the circuit breaking components include at least a stationary set of contacts and a movable set of contacts, a trigger pin disposed within the housing, wherein the trigger pin defines an axis and has a notch defined therein, wherein the trigger pin is movable between an operational state and a tripped state, wherein the trigger pin is biased toward the tripped state, wherein the movable set of contacts are in contact with the stationary set of contacts when the trigger pin is in the operational state, a shelf positioned in and supported by the bottom cover, wherein the shelf includes a pivot cone having an opening defined therein, a first member that includes
  a weight movable between an operational state and a tripped state,
  a first shaft extending upwardly from the weight and through the opening in the pivot cone, and
  a first plate affixed to the first shaft, wherein the first plate is supported by the pivot cone, a second member that includes
  a second plate in contact with the first plate, and
  a second shaft extending upwardly from the second plate, and a trigger lever latch having first and second ends, a first portion operatively associated with the second shaft and a second portion extending upwardly at an angle away from the first portion, wherein the second end of the trigger lever latch is positioned in the notch to hold the trigger pin in the operational state, whereby movement of the weight from the operational state to the tripped state moves the second end of the trigger lever latch downwardly and out of the notch, and the trigger pin is biased to the tripped state, thereby moving the movable set of contacts out of contact with the stationary set of contacts.

11. The seismic actuated circuit breaker assembly of claim 10 wherein the housing includes an opening through which the second portion of the trigger lever latch extends, wherein the opening is at least partially defined by a surface, and wherein the second portion of the trigger lever latch rests on the surface when the trigger pin is in the tripped state.

12. The seismic actuated circuit breaker assembly of claim 11 wherein the second shaft includes a groove defined therein and the first portion of the trigger lever latch includes a notch defined therein, and wherein the notch is received in the groove.

13. The seismic actuated circuit breaker assembly of claim 11 wherein the second member further comprises a leaf spring having an opening defined therein, wherein the second shaft extends through the opening in the leaf spring, and wherein the leaf spring biases the second plate to an operational state.

14. The seismic actuated circuit breaker assembly of claim 10 wherein the notch includes an engagement surface, wherein the second end of the trigger lever latch engages the engagement surface, wherein the engagement surface defines a first angle with respect to the trigger pin axis, the second end of the trigger lever latch defines a second angle with respect to the trigger pin axis, and the first and second angles are different.

15. The seismic actuated circuit breaker assembly of claim 10 wherein the set of movable contacts are positioned on a beam, and wherein the trigger pin extends into an opening in the beam.

16. The seismic actuated circuit breaker assembly of claim 15 wherein the housing includes a side cover having an opening defined therein, wherein the beam includes a stem that extends into the opening in the side cover, and wherein at least a portion of the stem extends outside the cover when the trigger pin is in the tripped state.

17. The seismic actuated circuit breaker assembly of claim 10 wherein the stationary set of contacts are in electrical communication with buss bars, which are adapted to be connected within an electrical circuit.

18. The seismic actuated circuit breaker assembly of claim 16, further comprising a reset mechanism, wherein the reset mechanism includes a housing having a front opening defined therein that is covered by a door that is movable between an operational state and a tripped state, and a reset pin with first and second ends, wherein the first end is operatively associated with the stem and the second end contacts the door, wherein when the trigger pin moves to the tripped state, the reset pin moves the door to the tripped state.

19. A seismic actuated gas shut off valve assembly for use with a gas regulator having a diaphragm, the assembly comprising:

a housing having a bottom cover extending downwardly therefrom, a trigger pin disposed within the housing, wherein the trigger pin defines an axis and includes an engagement surface, wherein the trigger pin is movable between an operational state and a tripped state, wherein the trigger pin is biased toward the tripped state, wherein the trigger pin includes first and second ends, wherein the second end is adapted to be operatively connected to the diaphragm, a shelf positioned in and supported by the bottom cover, wherein the shelf includes a pivot cone having an opening defined therein, a first member that includes
  a weight movable between an operational state and a tripped state,
  a first shaft extending upwardly from the weight and through the opening in the pivot cone, and
  a first plate affixed to the first shaft, wherein the first plate is supported by the pivot cone, a second member that includes
  a second plate in contact with the first plate, and
  a second shaft extending upwardly from the second plate, and a trigger lever latch having first and second ends, a first portion operatively associated with the second shaft and a second portion extending upwardly at an angle away from the first portion, wherein the second end of the trigger lever latch engages the engagement surface of the trigger pin in the operational state, whereby movement of the weight from the operational state to the tripped state moves the second end of the trigger lever latch downwardly and out of the notch, and the trigger pin is biased to the tripped state.

20. The seismic actuated gas shut off valve assembly of claim 19 wherein the housing includes an opening through which the second portion of the trigger lever latch extends, wherein the opening is at least partially defined by a surface, and wherein the second portion of the trigger lever latch rests on the surface when the trigger pin is in the tripped state.

21. The seismic actuated gas shut off valve assembly of claim 20 wherein the second shaft includes a groove defined therein and the first portion of the trigger lever latch includes a notch defined therein, and wherein the notch is received in the groove.

22. The seismic actuated gas shut off valve assembly of claim 20 wherein the second member further comprises a leaf spring having an opening defined therein, wherein the second shaft extends through the opening in the leaf spring, and wherein the leaf spring biases the second plate to an operational state.

23. The seismic actuated gas shut off valve assembly of claim 19 wherein the engagement surface defines a first angle with respect to the trigger pin axis, the second end of the trigger lever latch defines a second angle with respect to the trigger pin axis, and the first and second angles are different.

24. The seismic actuated gas shut off valve assembly of claim 19 wherein the trigger pin includes a sleeve received thereon, wherein the engagement surface is defined in the sleeve.

25. The seismic actuated gas shut off valve assembly of claim 24 wherein the second end of the trigger pin includes external threads that receive a threaded bushing, wherein the threaded bushing is adapted to be connected to the diaphragm.

26. The seismic actuated gas shut off valve assembly of claim 20 wherein the housing includes a reset button in associated with the first end of the trigger pin.

27. The seismic actuated gas shut off valve assembly of claim 26 wherein the housing comprises a top cover that is secured to the bottom cover, a ring secured to the top cover, and a two piece threaded insert sleeve received in the ring, wherein the two piece threaded insert sleeve is adapted to be connected to the gas regulator.

* * * * *